US011588833B2

United States Patent
Su et al.

(10) Patent No.: US 11,588,833 B2
(45) Date of Patent: Feb. 21, 2023

(54) TRACING TRAFFIC IN THE INTERNET

(71) Applicant: Agency for Science, Technology and Research, Singapore (SG)

(72) Inventors: Le Su, Singapore (SG); Dinil Mon Divakaran, Singapore (SG); Vrizlynn Ling Ling Thing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 282 days.

(21) Appl. No.: 16/955,625

(22) PCT Filed: Dec. 26, 2017

(86) PCT No.: PCT/SG2017/050646
§ 371 (c)(1),
(2) Date: Jun. 18, 2020

(87) PCT Pub. No.: WO2019/132764
PCT Pub. Date: Jul. 4, 2019

(65) Prior Publication Data
US 2021/0058410 A1    Feb. 25, 2021

(51) Int. Cl.
*H04L 9/40* (2022.01)
(52) U.S. Cl.
CPC ...... *H04L 63/1416* (2013.01); *H04L 63/1458* (2013.01)
(58) Field of Classification Search
CPC .................................................. H04L 63/1416
(Continued)

(56) References Cited

U.S. PATENT DOCUMENTS 9,060,019 B2 * 6/2015 Belenky .............. H04L 63/1466
11,128,658 B2 * 9/2021 Cheng ................. H04L 63/1458
(Continued)

FOREIGN PATENT DOCUMENTS

CN   101873258 A   10/2010
WO   2017164820 A1  9/2017

OTHER PUBLICATIONS

Song et al., "Advanced and Authenticated Marking Schemes for IP Traceback," IEEE INFOCOM '01, 2001, pp. 878-886.
(Continued)

*Primary Examiner* — Badri Narayanan Champakesan
(74) *Attorney, Agent, or Firm* — Shackelford, Bowen, McKinley & Norton, LLP

(57) ABSTRACT

A traceback solution is provided. For a network of autonomous systems, the traceback solution traces the autonomous system path taken by traffic flows. Every link in the traceback path is created, verified, and audited by autonomous systems. Multiple autonomous systems may take part in the process, making the system robust against fake information. The database used to store the validated traceback paths is a decentralized and distributed storage. Multiple copies of the database may be maintained by the network of autonomous systems. The database may be accessible by any participating autonomous system; and is not accessible from outside the network of autonomous systems. The traceback solution achieves both validation and non-repudiation property among the ASes. The traceback solution mitigates some important attack scenarios that might be targeted specifically at the traceback solution.

14 Claims, 13 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2006/0184690 | A1* | 8/2006 | Milliken | H04L 63/1466 726/3 |
| 2007/0206605 | A1* | 9/2007 | Ansari | H04L 63/1458 370/395.5 |
| 2007/0282951 | A1* | 12/2007 | Selimis | H04L 67/75 709/205 |
| 2008/0244739 | A1* | 10/2008 | Liu | H04L 63/1466 726/22 |
| 2010/0138539 | A1* | 6/2010 | Neville | H04L 45/308 713/176 |
| 2015/0287026 | A1* | 10/2015 | Yang | G06Q 20/3678 705/69 |
| 2016/0344550 | A1* | 11/2016 | Anton | H04L 9/3236 |
| 2016/0344737 | A1* | 11/2016 | Anton | H04L 63/0815 |
| 2017/0134413 | A1* | 5/2017 | Kim | H04L 43/026 |
| 2017/0134937 | A1* | 5/2017 | Miller | G06Q 20/3829 |
| 2017/0286951 | A1* | 10/2017 | Ignatchenko | G06Q 20/3823 |
| 2017/0366416 | A1* | 12/2017 | Beecham | H04L 45/50 |
| 2019/0130387 | A1* | 5/2019 | Arora | H04L 9/30 |
| 2019/0130398 | A1* | 5/2019 | Brown | H04L 9/0825 |
| 2020/0125720 | A1* | 4/2020 | Englund | G06F 21/57 |

OTHER PUBLICATIONS

Yaar et al., "StackPi: New Packet Marking and Filtering Mechanisms for DDoS and IP Spoofing Defense," IEEE Journal on Selected Areas in Communications, vol. 24, No. 10, Oct. 2006, pp. 1853-1863.

Cheng et al., "Opportunistic Piggyback Marking for IP Traceback," IEEE Transactions on Information Forensics and Security, vol. 11, No. 2, Feb. 2016, pp. 273-288.

Snoeren et al., "Hash-Based IP Traceback," SIGCOMM '01, San Diego, California, U.S.A., Aug. 27-31, 2001, pp. 3-14.

Gong et al., "Single Packet IP Traceback in AS-level Partial Deployment Scenario," IEEE Globecom '05, 2005, pp. 1817-1821.

Cheng et al., "Fact: A Framework for Authentication in Cloud-based IP Traceback," IEEE Transactions on nfomnation Forensics and Security, vol. 12, No. 3, 2017, pp. 604-616.

Gong et al., "A More Practical Approach for Single-Packet IP Traceback Using Packet Logging and Marking," IEEE Transactions on Parallel and Distributed Systems, vol. 19, No. 10, Oct. 31, 2008, pp. 1310-1324.

International Search Report for International Application No. PCT/SG2017/050646 dated Mar. 1, 2018, pp. 1-4.

Written Opinion of the International Searching Authority for International Application No. PCT/SG2017/050646 dated Mar. 1, 2018, pp. 1-4.

\* cited by examiner

An attempt to divert the path to a non-participating upstream router

An attempt to divert the path to a non-participating downstream router

An attempt by an AS that has switched an FoI to exclude itself in the routing path of the FoI An attempt to launch an attack due to the miss-scenario

TRACING TRAFFIC IN THE INTERNET

TECHNICAL FIELD

Various aspects of this disclosure generally relate to cybersecurity, and more particularly, to Internet Protocol (IP) traceback.

BACKGROUND

Large-scale attacks, such as distributed denial of service (DDoS) attacks, are becoming an increasing concern and threat to any service provided over the Internet. With the explosion of Internet of things (IoT) market, the threat is expected to increase, as witnessed by the massive DDoS attack launched using IoT devices. The rate of attacks has only been increasing, from what was gigabits/second to the recent terabits/second.

In this context, it becomes important to trace the sources of attacks as early as possible, to timely attribute and mitigate the attack. By identifying the sources or even the partial attack paths, one may be able to deploy mitigation solutions before the attack traffic flows reach the victim. However, the attack sources may use spoofed IP addresses, thus posing a challenge in identifying the source and tracing path of the attack. Traditionally, there exists no ubiquitously deployed traceback solution in the Internet.

It may be desirable to have a traceback solution that achieves both validation and non-repudiation properties among entities participating in the traceback solution. The entities participating in the traceback solution may be autonomous systems (ASes) connecting the Internet. Therefore, to achieve both validation and non-repudiation properties, once an autonomous system (AS) makes a statement that it has transferred (switched) a traffic flow of interest from itself to another AS, (i) this statement should be verified and validated by the system, and (ii) such a statement cannot be denied by the ASes (between which the traffic is switched).

Traditional traceback solutions assume that ASes faithfully mark or log the flow or packet transition. There is no record integrity, authenticity, and non-repudiation in traditional traceback solutions. Thus, it is difficult to identify malicious tampering of the traceback information in traditional traceback solutions.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

In one aspect of the disclosure, a traceback solution inspired largely by the blockchain technology is provided. For a network of autonomous systems (ASs), the traceback solution traces the AS path taken by traffic flows. That is, a link in an identified path connects two ASes of the network of ASes. Every link in the traceback path is created, verified, and audited by ASes. Multiple ASes may take part in the process, making the system robust against fake information. The database used to store the validated traceback paths (referred to as global ledger) is a decentralized and distributed storage. Multiple copies of the database may be maintained by the network of ASes. The database may be accessible by any participating AS; and is not accessible from outside the network of ASes. The traceback solution achieves both validation and non-repudiation property among the ASes. The traceback solution mitigates some important attack scenarios that might be targeted specifically at the traceback solution.

The traceback solution may use cryptographic primitives at multiple steps of identifying the AS link (link between ASes) taken by a traffic flow of interest. The fundamental transactions corresponding to the AS link are verified and validated. Beyond the ASes that form the link in path, other ASes may perform audit to validate the transactions related to the link. The verified and audited AS link (path segment) may be stored in a decentralized storage distributed across the network of ASes. The distributed storage adds both redundancy and robustness to the system. There is no centralized controller in the traceback solution.

In one aspect of the disclosure, a method, a computer-readable medium, and an apparatus for IP traceback are provided. The apparatus may receive an init transaction associated with a set of packets to be switched from a first autonomous system to a second autonomous system. The apparatus may verify the init transaction. The apparatus may generate a verify transaction associated with the set of packets if the verification of the init transaction is successful. The apparatus may store the verify transaction at a global ledger.

In another aspect of the disclosure, a method, a computer-readable medium, and an apparatus for IP traceback are provided. The apparatus may belong to a first autonomous system. The apparatus may receive a verify transaction recorded in a global ledger. The verify transaction may be generated by a second autonomous system. The apparatus may verify the verify transaction. The apparatus may generate a first auditor digital signature using a private key of the first autonomous system if the verifying of the verify transaction is successful. The auditor digital signature may be appended to the verify transaction. The apparatus may verify an init transaction corresponding to the verify transaction. The apparatus may generate a second auditor digital signature using a private key of the first autonomous system if the verifying of the init transaction is successful. The second auditor digital signature may be appended to the init transaction.

In yet another aspect of the disclosure, a method, a computer-readable medium, and an apparatus for IP traceback are provided. The apparatus may retrieve a verify transaction recorded in a global ledger. The verify transaction may be associated with a set of packets and generated by a destination device for the set of packets. The verify transaction has been successfully audited by at least a threshold number of autonomous systems. The apparatus may retrieve recursively a previous verify transaction of the verify transaction by searching the global ledger. The previous verify transaction may be associated with the set of packets and have been successfully audited by at least the threshold number of autonomous systems. The apparatus may identify a source device for the set of packets when the recursive retrieving terminates. The apparatus may deploy preventive or mitigate action on the source device.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

DETAILED DESCRIPTION

Figure 1:
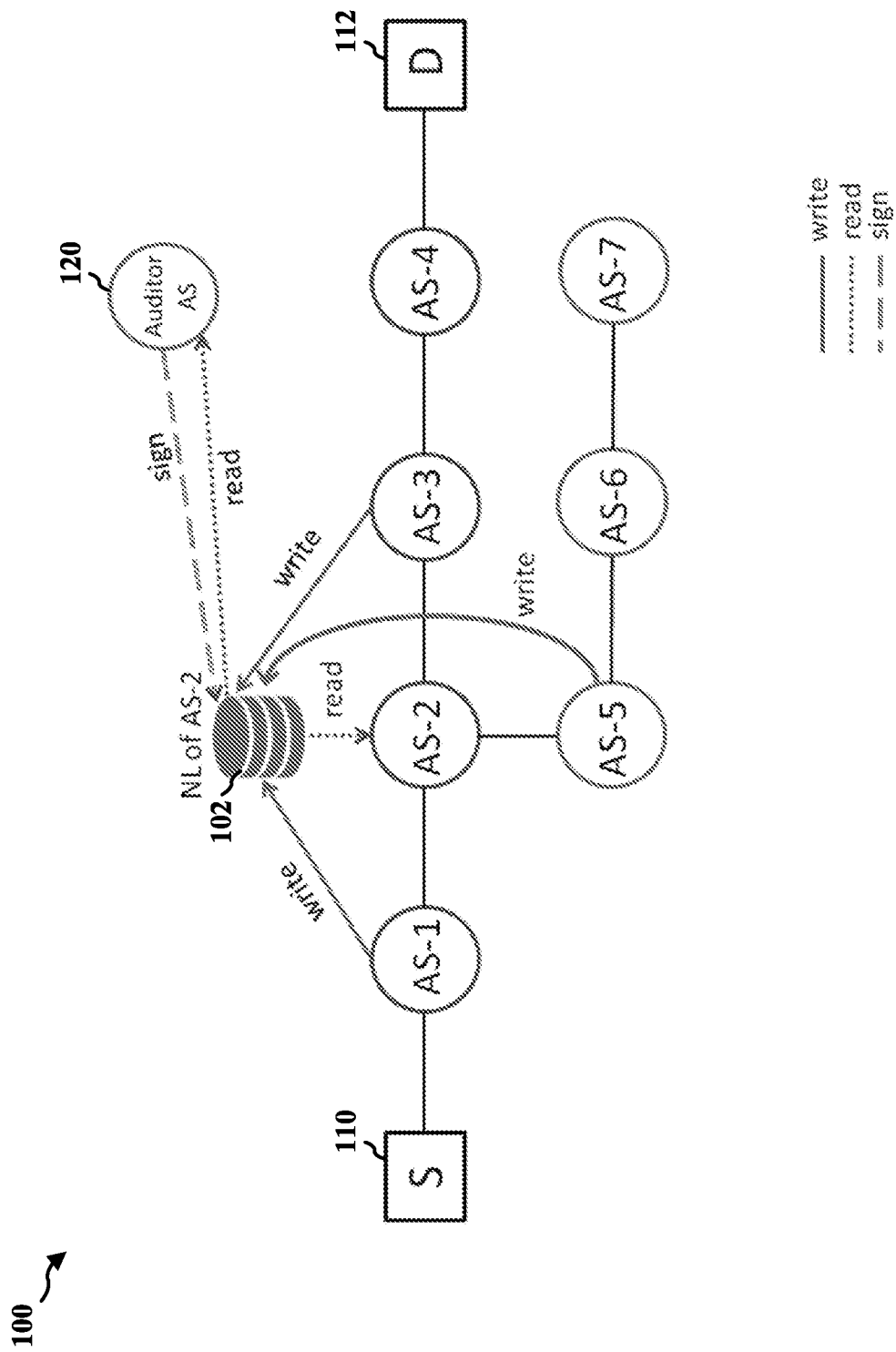
FIG. 1 is a diagram illustrating an example of a neighbor ledger in a network.

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of IP traceback will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

An autonomous system (AS) may be a network of routers with one single routing policy and under one administrative control. An Internet Service Provider (ISP) may possess one or more ASes. In some embodiments, a traceback solution for a network of ASes is provided. The traceback solution may trace the path consisting of ASes taken by a packet or a traffic flow.

Autonomous systems may be free to have independent traceback solutions for internal tracing of traffic. That is, two ASes may have different internal methods deployed for tracing the path taken by a traffic flow. The internal path of an AS may be the path formed by routers of the AS.

An autonomous system may decide to mark and create a corresponding log transaction for a single packet or a set of packets, which may be referred to as 'flow of interest'. A flow of interest (FoI) may consist of one or more packets. More details on how a particular FoI is identified correctly at each AS (and end-user) is described later.

An autonomous system may decide to mark an FoI either if an upstream AS has indicated the same, or if it is triggered by an internal system. An internal system might be an anomaly detection solution deployed within the AS. The details of such an anomaly detector are out of scope of this disclosure. For this disclosure, it may be sufficient to assume that there is a positive probability that an AS decides on its own to track an FoI.

A flow of interest may consist of variable number of packets. For a given FoI, a unique identifier (ID) may be created using the five-tuple of {source and destination IP addresses, source and destination ports, protocol}, the timestamp of the first packet of the FoI (e.g., in the granularity of milliseconds), as well as the hash of the payloads of all packets forming the FoI. This ID may be created by the first AS that decides to create a transaction for this flow of interest. All ASes use the same ID for a given FoI. To make it easy for downstream ASes to recognize an FoI being traced, the first AS may embed a mark in all packets of an FoI. The mark may be a specific bit pattern that is embedded using first four of the eight bits in the unused type of service (TOS) part of the header. Beyond this, no header space in packets is used in the traceback solution.

The traceback solution of some embodiments may be described as a set of transactions created, verified, and validated (audited) by ASes themselves. In such embodiments, an AS may decide to trace an FoI, generate an ID for the FoI, and create a new transaction corresponding to the FoI. This new transaction, which may be referred to as init transaction, may be stored in a ledger of the next-hop AS. This ledger of the next-hop AS may be referred to the neighbor ledger. The AS may also mark the packets constituting this specific FoI. The next-hop AS, on receiving the marked packets, may extract the details of the FoI and performs a lookup in its neighbor ledger. The next-hop AS may verify the corresponding transaction, by creating a new transaction in a different ledger, which may be referred to as the global ledger. Subsequently (e.g., upon being notified), any AS may take up the role as auditor to validate these two transactions (init and verify transactions stored in different ledgers). When a sufficient (e.g., predefined) number of such auditors have validated the two transactions (init and verify), the init transaction in the neighbor ledger may be marked for removal, and the verify transaction in the global ledger becomes an undeniable and validated transaction, which may be looked up by an AS.

In some embodiments, the system architecture may consist of a network of ASes and two types of ledgers—global ledger and neighbor ledger. An AS may take any one of the three roles—namely, initiator, verifier, and auditor. When an AS receiving an FoI decides to trace the FoI, the AS assumes the role of initiator. An initiator may create an init transaction as defined later. When an AS verifies an init transaction, it assumes the role of a verifier. A verifier may create a new transaction, which may be referred to as the verify transaction. An auditor is an AS that checks and validates the integrity and authenticity of an FoI switched from initiator to the verifier.

There are two types of transactions, one is init transaction, and another is verify transaction. The init transaction is created by the initiator AS, when the initiator AS decides to trace a flow-of-interest. After an AS receives the FoI from the initiator, the AS becomes the verifier. Upon successfully verifying the init transaction, the verifier may create a verify transaction. With the verify transaction, the verifier is confirming that it has indeed received the specific FoI that was specified in the init transaction from the neighboring initiator AS. Below is the general format that may be used for both init transaction and verify transaction.

| Initiator ID | Verifier ID | FoI ID | Status | PreTxnHash | Reserved Field | Digital Signature |
|---|---|---|---|---|---|---|

As described above, an init transaction or verify transaction may include an initiator ID field, a verifier ID field, an FoI ID field, a status field, a PreTxnHash field, a reserved field, and a digital signature field. The initiator ID and verifier ID fields are used to identify the corresponding ASes involved in the switching of the FoI. The initiator ID and verifier ID may be the Autonomous System Numbers (ASNs) assigned to corresponding ASes. The initiator ID field may contain the identifier of a source. This will be considered and explained in the border-case scenarios described below with reference to FIG. 6.

The FoI ID field stores the information that could uniquely identify this FoI throughout the switching and logging process. Below is an example of the FoI ID format.

| source IP | source Port | destination IP | destination Port | protocol | timestamp | h |
|---|---|---|---|---|---|---|

As described above, the FoI ID includes the {source IP, source Port, destination IP, destination Port, Protocol} five-tuple. Timestamp (TS) here refers to the time at which the first packet arrived at the first AS in the path. The last field h is the hash of the payloads of all packets that constitute the FoI.

The status field is a Boolean field specifies the type of transaction. For example, a set bit (status=1) means the transaction is an init transaction, and clear bit (status=0) means the transaction is a verify transaction. More details on these transactions are given later.

The PreTxnHash field is a previous transaction hash field that stores the hash output of the previous transaction. The details of previous transaction could be obtained from one of the ledgers (introduced below). In some embodiments, a standard hash function (e.g., SHA-256) may be used for computation of the hash output.

The reserved field (RF) may be used for storing the Autonomous System Number (ASN) of an AS, in case along the routing path, some ASes do not consider a set of packets as FoI. This field may potentially help to link up the routing path during traceback. This special case will be discussed in later section.

To maintain the transaction integrity and authenticity, a standard digital signature scheme DS=(DS_Sign, DS_Verify) may be employed. Each AS has its own DS public-private key pair (pk, sk). Given a message M, an entity with a private key sk may generate a digital signature sig by, $$sig=DS\_Sign(M,sk).$$

Anyone with the public key pk (publicized by the owner) and the signature sig, may verify the signature sig using DS_Verify(sig, pk). If the signature sig is correctly formed using the private key sk, the output of the DS_Verify(sig, pk) function will indicate a successful verification, and verification failure otherwise.

In some embodiments, whenever there is a transaction, the respective AS may produce a digital signature sig=DS_Sign (M, sk), where M is

| Initiator ID | Verifier ID | FoI ID | Status | PreTxnHash | Reserved Field |
|---|---|---|---|---|---|

In other words, the digital signature field of a transaction may be generated based on the previous six fields of the transaction. For notation simplicity, in the subsequent description, the digital signature field may be denoted as DS.

In some embodiments, there are two types of ledgers: one is referred to as neighbour ledger (NL) and the other referred to as global ledger (GL). Role based access rights on the ledgers is assumed. The access rights assigned to different roles are read, write, and sign. Even though both write and sign accesses allow a node to write on to the ledger, write and sign accesses give permission to write on to different fields of a record. The sign access gives an AS permission to write only into the digital signature field of a record, whereas the write access gives an AS permission to write only on the remaining fields of the record (i.e., excluding the digital signature field). Formally, a ledger is a database of records accessed using keys, where each record has details of the transaction as well as space for n digital signatures (of different auditors).

FIG. 1 is a diagram illustrating an example of a neighbor ledger 102 in a network 100. In the example, the network 100 may include a source 110, a destination 112, ASes 1-7, and an auditor AS 120. Every AS in the network 100 has an associated NL. For example, AS-2 has an associated NL 102. However, the write access on a particular neighbour ledger hosted at an AS, say AS-k, is assigned only to the topological neighbours of that particular AS (here, AS-k). For example, the write access on the NL 102 is assigned only the AS-1, AS-3, and AS-5, which are topological neighbours of AS-2. ASes (e.g., AS-4, AS-6, AS-7) that are not topological neighbours of AS-2 do not have write access on the NL 102. The hosting AS (e.g., AS-2) has only read access on its NL (e.g., NL 102). In fact, every AS has read access on all NLs hosted in the network 100.

An NL hosted at an AS may be used by the neighbors of the hosting AS to store initiate (or init) transactions. For example, if AS-1 decides to mark an FoI, it creates an init transaction and creates a corresponding entry in the NL 102 of AS-2. This allows AS-2 to verify the transaction later. Once an AS stores a record in the NL of its neighbor, it notifies its neighbors that a new init transaction is stored in the specific NL. The ASes receiving the notification again broadcast the message to its neighboring ASes, to spread the information in the network 100. A simple limited flooding solution is assumed, where the notification is broadcast to m of the M neighboring nodes of an AS. An init transaction that has not been verified and audited within a pre-defined time-period of t seconds may be automatically considered void. As a result, the corresponding space in the neighbor ledger may be marked as free and may be overwritten. Similarly, once an init transaction has been verified and audited by sufficient number of auditors, it is no more of use, and hence the space occupied by the init transaction in the NL may be marked as free to be used by other transactions.

The format of NL records is as shown below.

| Key | Transaction | Auditor Digital Signatures | | | |
|---|---|---|---|---|---|
| | | Auditor 1 | Auditor 2 | ... | Auditor n |

The key field is the identifier for the AS writing the record. In some embodiments, the key field contains the AS number (ASN) for the AS writing the record. For example, if AS-1 is writing an init transaction into the NL 102 hosted at AS-2, then the key field of the record containing the init transaction is the ASN of AS-1. The transaction field is an init transaction, as explained previously. The auditor digital signatures field is to store the digital signatures of the auditing ASes. For example, the auditor AS 120 may have sign access to the NL 102 and may put its digital signature into the auditor digital signatures field (e.g., Auditor 1 field) of an NL record containing an init transaction if the auditor AS 120 audits the init transaction successfully. The operations of an auditor AS is explained in a later section. The number of auditors signing a transaction is limited to n, a predefined value. In some embodiments, the auditors signing a transaction may not be the initiator or verifier of the transaction.

Figure 2:
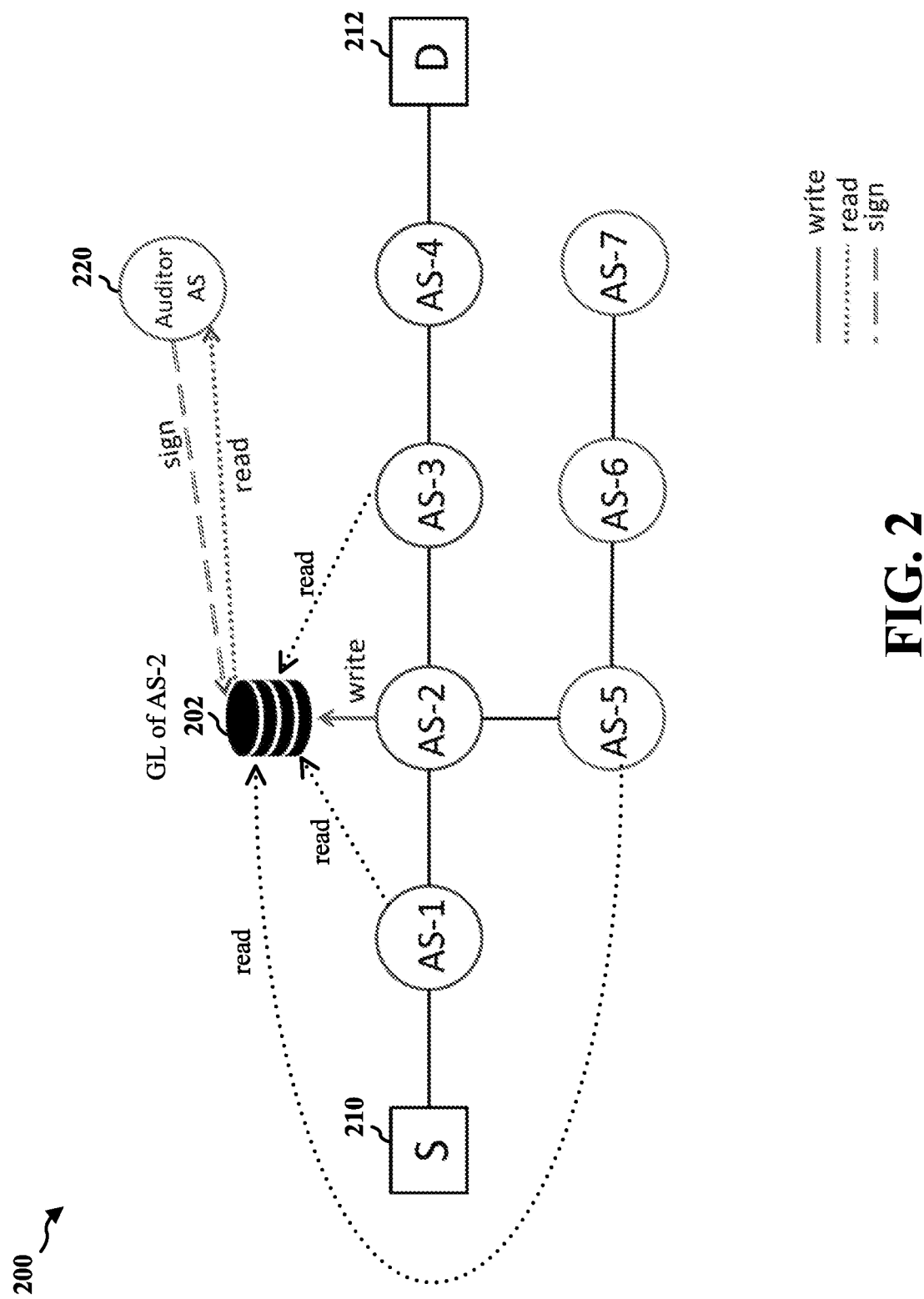
FIG. 2 is a diagram illustrating an example of a global ledger in a network.

FIG. 2 is a diagram illustrating an example of a global ledger in a network 200. In the example, the network 200 may include a source 210, a destination 212, ASes 1-7, and an auditor AS 220. The GL 202 is a distributed and decentralized ledger that is stored in all ASes. For the description below, it is assumed that the GL has a logical view with respect to each AS. A logical view of GL with respect to an AS consists of the verified transactions of that particular AS. For example, the logical view of the GL 202 may contain verified transactions from AS-2. Observe that, a logical view may be obtained by extracting records using the specific AS number as the key.

In some embodiments, an AS has write access on its GL view. For example, AS-2 has write access on the logical view of the GL 202. Only auditor ASes (e.g., the auditor AS 220) have sign access to the GE All ASes have read access to the GL.

The GL is used to hold verified and audited transactions. Once an init transaction is verified by an AS, the AS creates a new verify transaction and stores the same in its logical view of the GL. Subsequently, the AS may notify the network that a new verified transaction is stored in the GL for being audited, e.g., using the simple limited flooding solution mentioned above. The ASes receiving the notification may choose to perform the task of auditing. To audit, the auditor may download the new (and latest set of) transactions from the GL. After the auditor has validated the transaction, it notifies its neighbors, that a new transaction has been validated, thus initiating the limited flooding of notification. On receiving the notification, the ASes update their copies of GL.

The format of a GL record is the same as that of the NL. Same as in the NL, the number of auditors signing a transaction is limited to n, a predefined value.

Figure 3:
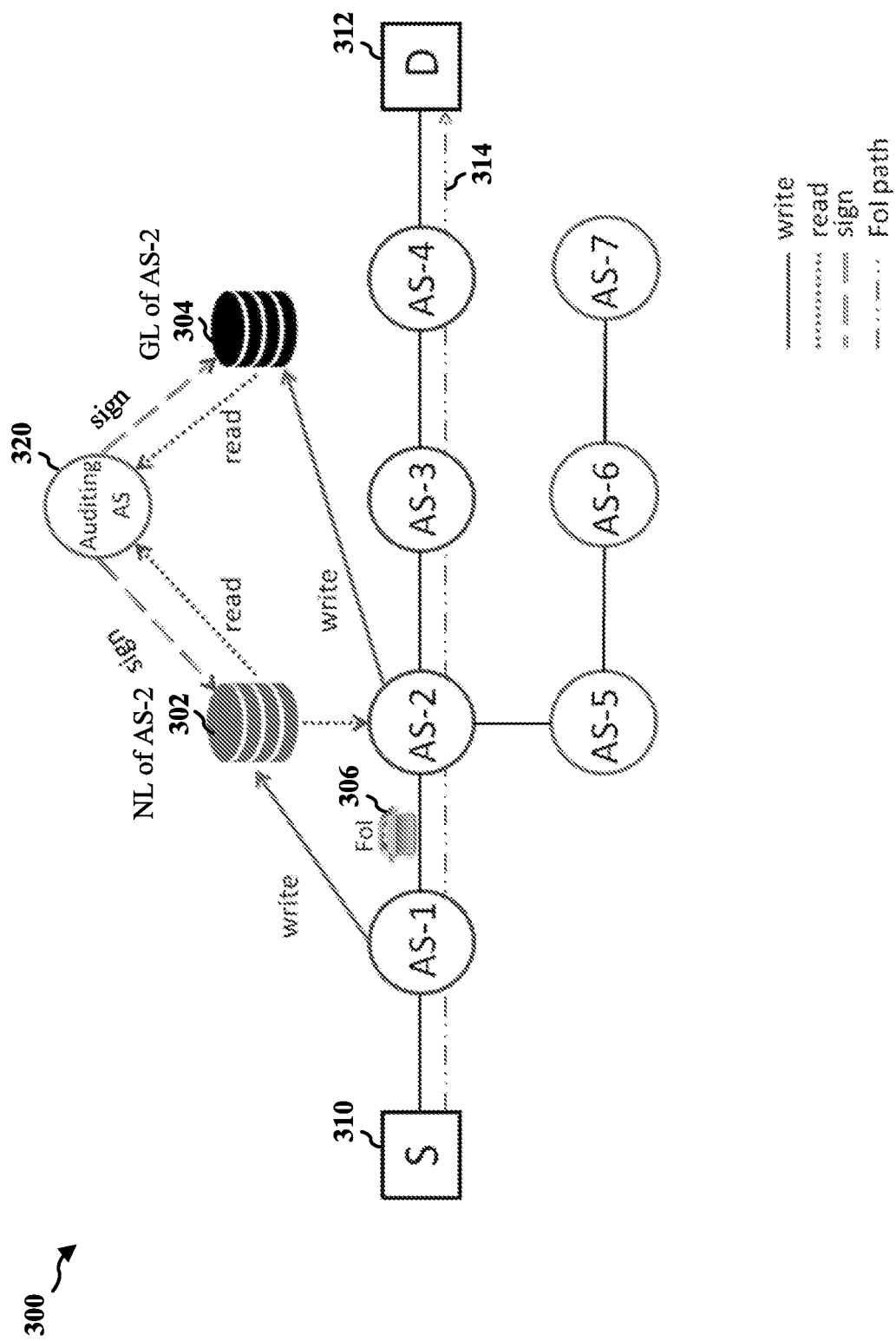
FIG. 3 is a diagram illustrating an example of a network system in which the traceback solution of some embodiments is implemented.

FIG. 3 is a diagram illustrating an example of a network system 300 in which the traceback solution of some embodiments is implemented. In the example, the network system 300 may include a source 310, a destination 312, ASes 1-7, and an auditing AS 320. An FoI 306 may be routed from the source 310 to the destination 312 as indicated—taking the path 314, i.e., [S, AS-1, AS-2, AS-3, AS-4, D]. The first AS, namely AS-1, decides to trace the FoI 306, and therefore marks the FoI 306, and creates a new init transaction in an NL 302 hosted at AS-2. That is, AS-1 took the role of initiator. When the FoI 306 reaches AS-2, AS-2 extracts the details of the FoI 306 and performs a lookup on the NL 302. On finding a matching entry in the NL 302, AS-2 takes the role of verifier and verifies the entry. After successful verification, AS-2 creates a verify transaction in the GL 304.

On being notified of the new transactions, some of the ASes (e.g., the auditing AS 320) may decide to perform audit operation (described below), thus taking up auditor role. After sufficient number of auditors have validated and signed the corresponding transactions in the NL 302 and the GL 304, the transaction in the NL 302 may be marked as void, thereby indicating the space may be freed up. The transaction corresponding to the FoI 306 in the GL 304 now becomes an undeniable and validated transaction, becoming evidence of transit of a specific FoI 306 from AS-1 to AS-2.

Different actions may be taken by the ASes when they take different roles as defined previously. There may be three different operations, namely initiation, verification and audit.

Figure 4:
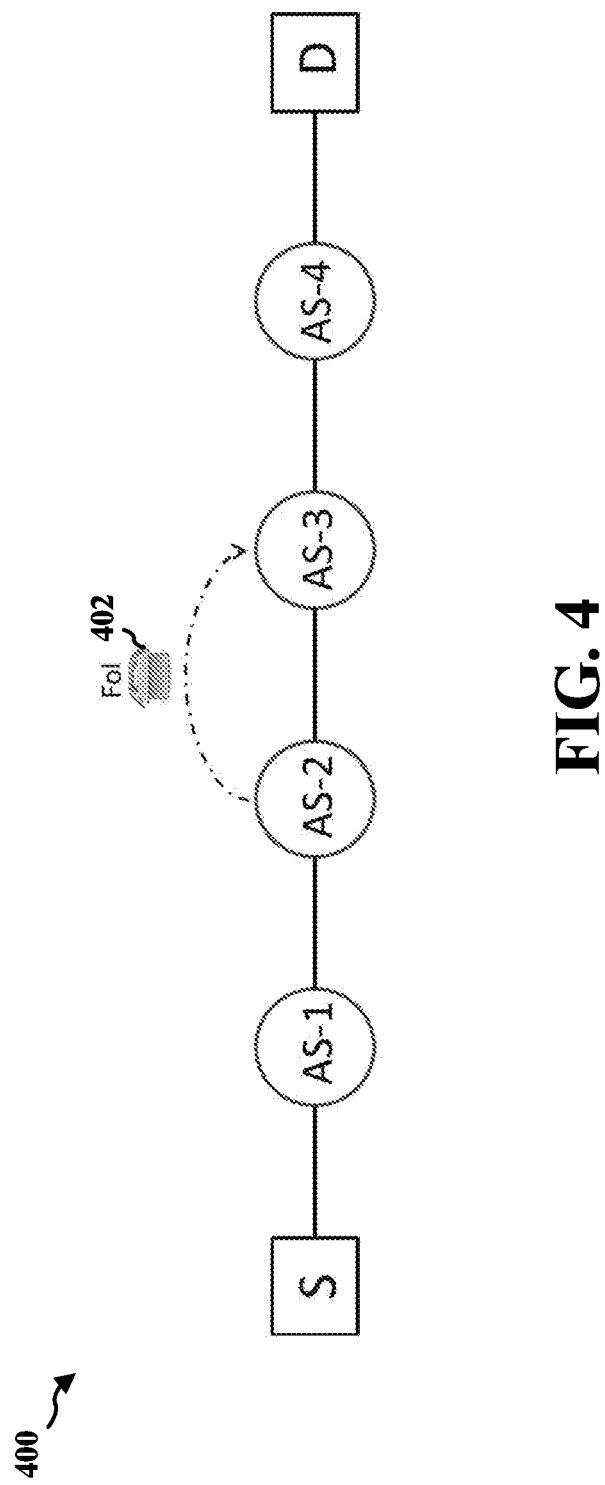
FIG. 4 is a diagram that aids to understand an example of initiation and verification operations.

FIG. 4 is a diagram 400 that aids to understand an example of initiation and verification operations. Whenever an AS has decided to trace an FoI that is going to be switched to the next AS, the sending AS, assuming the role of initiator, initiates a transaction following the above mentioned format, and writes it into the neighbor ledger of the receiving AS (the verifier). For example, AS-2 may decide to trace an FoI 402 and switch the FoI to AS-3. The corresponding init transaction is given below.

| Initiator ID | Verifier ID | FoI ID | Status | PreTxnHash | RF | DS |
|---|---|---|---|---|---|---|
| ASN_AS-2 | ASN_AS-3 | FoI ID of FoI 402 | 1 | H(txn_1) | 00 . . . 0 | Sig_2 |

This particular transaction may be denoted as txn_2. The status field has a set bit, indicating txn_2 as an init transaction; the initiator ID field indicates that txn_2 has been initiated by AS-2. It may be assumed that there is a previous verify transaction txn_1 that reflects the switching of this particular FoI 402 from AS-1 to AS-2. Thus, AS-2 may effectively extract txn_1 from the AS-2's view of GL, hash it using a hash function (e.g., SHA-256), and fill the output of the hash function into the PreTxnHash field. The reserved field is filled up with a string of zeros. In some embodiments, there may be a special case as described in later section, where the RF is filled with ASN. To maintain the integrity and authenticity, as mentioned above, AS-2 generates a digital signature Sig_2, using its own private key sk, and append it to the DS field. This txn_2 is then written into the neighbor ledger of AS-3.

From time to time, and in particular, on receiving a marked FoI, an AS may check its own NL, compare against the buffer storage it keeps, verify the transactions initiated by its neighbor ASes. It is assumed that each AS keeps a buffer storage for logging the traffic passing through it, and usually the FoI reaches each AS earlier than the init transaction appears in the NL of the AS. There is a matching if the FoI ID in the buffer storage is the same as the FoI ID in the init transaction stored in the NL, except that the timestamp in the FoI ID present in the buffer storage is not greater than the timestamp of the FoI present in the init transaction stored in the NL by more than a threshold length of time (e.g., n ms). It may be assumed that the time for a packet to transit from the first AS to the last AS (in a path) is not more than 50 ms. Note that all other fields of the FoI ID in the buffer storage and the FoI ID in the init transaction stored in the NL should be identical; and if so there is a match.

In the case of match, the current AS may perform the following two verifications. First, the current AS may verify the digital signature in this init transaction, using the upstream AS's public key. Second, the current AS may search through the GL view of the upstream AS, and extract the previous transaction details corresponding to the init transaction, and verify the hash output of the previous transaction is the same as the value in the PreTxnHash field of the init transaction.

If any of the above two steps is unsuccessful, the current AS will abort the verification, and ignore the init transaction. If the verification process is successful, the current AS will create a new transaction, with the same (initiator ID, verifier ID, FoI ID, RF) to be stored in the GL. However, the current AS will clear the status field of the new transaction to indicate a verify transaction. The PreTxnHash field of the verify transaction will store the hash result of the init transaction. And the current AS will add a digital signature of itself based on this newly created transaction.

Referring back to FIG. 4, AS-3 may have the following init transaction txn_2 (written by AS-2) stored in its NL.

| Initiator ID | Verifier ID | FoI ID | Status | PreTxnHash | RF | DS |
|---|---|---|---|---|---|---|
| ASN_AS-2 | ASN_AS-3 | FoI ID of FoI 402 | 1 | H(txn_1) | 00 . . . 0 | Sig_2 |

AS-3 may check its own buffer. If there is a match of the FoI ID (i.e., the FoI 402 indeed is received by AS-3), AS-3 may then verify Sig_2 using AS-2 public key. If the signature verification succeeds, AS-3 may proceed to search through AS-2's logical view of GL, identify the following verify transaction txn_1 using the FoI ID of FoI 402.

| Initiator ID | Verifier ID | FoI ID | Status | PreTxnHash | RF | DS |
|---|---|---|---|---|---|---|
| ASN_AS-1 | ASN_AS-2 | FoI ID of FoI 402 | 0 | H(txn_0) | 00 . . . 0 | Sig_1 |

The transaction txn_1 should exist in AS-2's logical view of GL as AS-2 should have received it from AS-1. If there is no match of FoI ID or the signature verification is not successful, AS-3 may abort the verification operation and ignore the init transaction txn_2 from AS-2.

Once AS-3 extracts the verify transaction txn_1, it hashes the same and then compares the hash result against the value in the PreTxnHash field of the init transaction txn_2. If the result matches, the verification process is successful, and AS-3 creates the following new verify transaction txn_3.

| Initiator ID | Verifier ID | FoI ID | Status | PreTxnHash | RF | DS |
|---|---|---|---|---|---|---|
| ASN_AS-2 | ASN_AS-3 | FoI ID of FoI 402 | 0 | H(txn_2) | 00 . . . 0 | Sig_3 |

The status field of the transaction txn_3 is set to zero, meaning this is a verify transaction, and AS-3 has verified the FoI 402. The PreTxnHash field has also been changed to H(txn_2). Similarly, AS-3 generates a new signature Sig_3. This transaction txn_3 will then be written into the global ledger, available for public audit.

An autonomous system may also assume the role of an auditor, and perform the audit task for the transactions recorded in the global ledger. The audit operation is similar to the verification operation. The major difference is that, for the audit operation, the auditor is expected to validate the entire transactions recorded in both NL and GL related to the same FoI, prior to the transaction being audited.

An auditor may start from a particular verify transaction (e.g., verify transaction txn_a) recorded in the GL. In some embodiments, the auditor may start to audit the particular verify transaction upon being notified of the verify transaction.

The auditor autonomous system may verify the digital signature of this starting verify transaction txn_a. For each such verify transaction, recall that, there is a corresponding initiator AS and verifier AS. The auditor may search through the NL of the AS that created this verify transaction (verifier AS for txn_a), extract the corresponding init transaction, hash the init transaction and compare the hash output with the PreTxnHash field of the verify transaction.

If the above steps of verification are successful, the auditor may generate a digital signature and append to the auditor digital signatures field of this starting verify transaction, and complete the audit for this particular transaction.

Based on the newly discovered init transaction, the auditor may search through the logical view of the GL of the initiator AS of the init transaction, and extract the corresponding verify transaction, which may be referred to as txn_b. Subsequently, the auditor AS may verify the signature of the init transaction, and compare the PreTxnHash field of the init transaction against the hash of the verify transaction txn_b. If both are successful, the auditor AS may add its digital signature to the auditor digital signatures field and completes the audit of this particular init transaction.

The above steps are the core part of audit for a particular pair of (init, verify) transaction. As the auditor gets a new verify transaction (txn_b) to audit, it then repeats the above steps for this newly discovered verify transaction txn_b. The process terminates when the initiator field extracted in a particular transaction is not an ASN, but a source ID. This means it has reached the source of this FoI.

Figure 5:
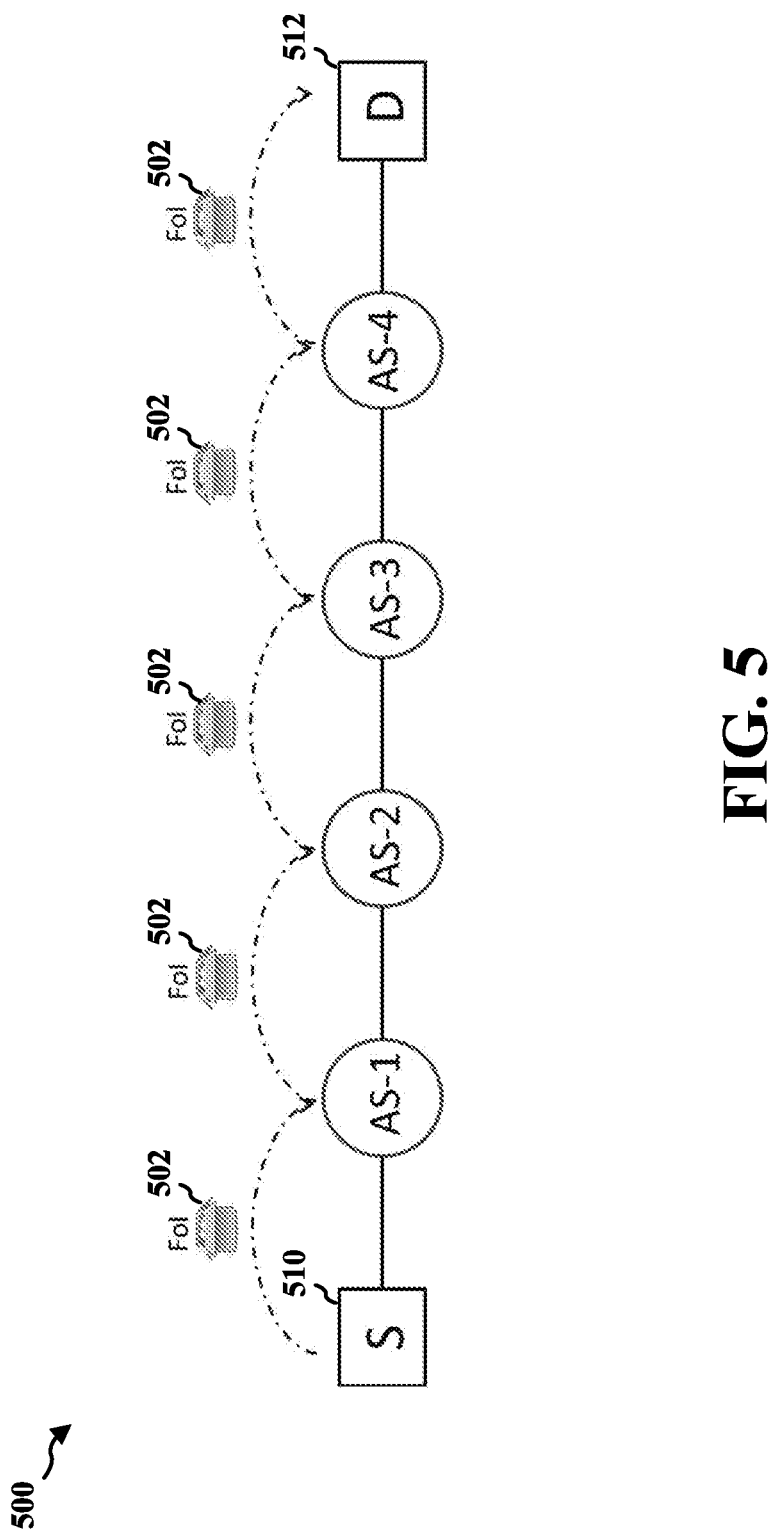
FIG. 5 is a diagram that aids to understand an example of audit operations.

FIG. 5 is a diagram 500 that aids to understand an example of audit operations. In the example, an FoI 502 is switched from source 510 to destination 512, passing through AS-1 to AS-4. In some embodiments, the auditor may be an AS that different from AS-1 to AS-4. In some embodiments, the following transactions may be in the NLs.

| NL-2 | txn_1 | ASN_AS-1 | ASN_AS-2 | omitted | 1 | H(txn_0) | Sig_1 |
| NL-3 | txn_3 | ASN_AS-2 | ASN_AS-3 | omitted | 1 | H(txn_2) | Sig_3 |
| NL-4 | txn_5 | ASN_AS-3 | ASN_AS-4 | omitted | 1 | H(txn_4) | Sig_5 |

In such embodiments, the following transitions may be in the GL.

| GL-1 | txn_0 | Source IP | ASN_AS-1 | omitted | 0 | H(00 . . . 0) | Sig_0 |
| GL-2 | txn_2 | ASN_AS-1 | ASN_AS-2 | omitted | 0 | H(txn_1) | Sig_2 |
| GL-3 | txn_4 | ASN_AS-2 | ASN_AS-3 | omitted | 0 | H(txn_3) | Sig_4 |
| GL-4 | txn_6 | ASN_AS-3 | ASN_AS-4 | omitted | 0 | H(txn_5) | Sig_6 |
| GL-4 | txn_7 | ASN_AS-4 | Dst ID | omitted | 0 | H(txn_6) | Sig_7 |

Note that, in the above transactions, the FoI field is omitted for simplicity, as it is the same across the transactions. The reserved field is also omitted. The first two columns are created for easy reference; they are not necessarily in the real transaction record.

Assume an auditor starts from AS-4's logical view of the GL (referred to as GL-4), transaction txn_6. The auditor may verify that Sig_6 is faithfully generated by AS-4. Then the auditor may find the corresponding init transaction txn_5 in the NL of AS-4 (referred to as NL-4), hash the init transaction txn_5 and compare with H(txn_5) stored in GL-4. If the output of hashing txn_5 matches H(txn_5) stored in GL-4, the auditor proceeds.

As the auditor has discovered the init transaction txn_5, it may verify that Sig_5 is faithfully generated by AS-3, and then traverse back to AS-3's logical view of the GL (referred to as GL-3), to discover verify transaction txn_4. The auditor may then verify that the hash output of the verify transaction txn_4 is the H(txn_4) stored in NL-4, and proceed if the verification succeeds.

The auditor may repeat the process described above until it reaches the transaction txn_0. The auditor may verify that Sig_0 is faithfully generated by AS-1, as well as verify that the stored value in the PreTxnHash field of transaction txn_0 is a hash result of a string of zeros (H(00 . . . 0)). If both verifications are correct, the auditor may complete the audit for the entire upstream transactions.

The auditor may generate a signature for each transaction it has successfully audited, and append the signature to the auditor digital signatures field of the transaction. This completes the audit process for this auditor AS regarding to this FoI 502.

In some embodiments, with large number of ASes in the network, many ASes would be available for performing audit in the network. Therefore, the entire transaction history of an FoI (e.g., the FoI 502) would be audited sufficient number of times.

In some embodiments, several special scenarios may need special treatment. These scenarios may be referred to as border-case scenarios and miss scenarios. In one border-case scenario, an AS may receive an FoI from a source device (the source device may be located inside the AS). In another border-case scenario, an AS may switch an FoI to a destination device (the destination device may be located inside the AS). In one miss-case scenario, one or more ASes may decide that a set of packets is not flow of interest and do not initiate/verify transactions associated with the set of packets. Note, the miss-case scenario is different from an AS drops a set of packets/flows. Under the miss-case scenario, the AS merely considers the set of packets is not an FoI, but still faithfully transmits the set of packets.

In some embodiments, the source or the destination host is neither assumed nor required to takes up any of the above-defined roles. A source/destination host may be a client of the connecting AS. Yet, under the above scenarios, for the completeness of the traceback solution, a border-case operation may be allowed. For example, when an AS is receiving (or sending) an FoI, it may self-create and verify a transaction with the initiator ID (or verifier ID) filled with source (or destination) identifier. A source (or destination) identifier may be either the media access control (MAC) address of the host or the link label that connects to the particular host.

Figure 6:
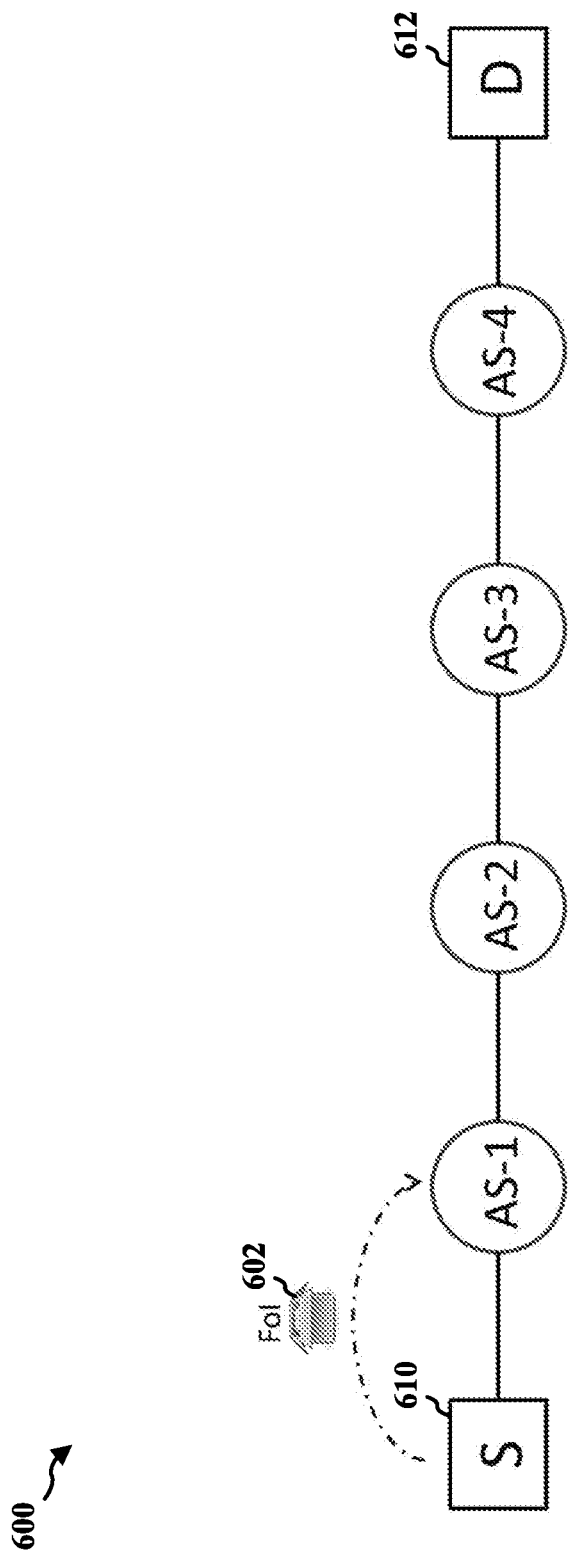
FIG. 6 is a diagram illustrating an example of a source host sending a flow of interest to an autonomous system.

FIG. 6 is a diagram 600 illustrating an example of a source host sending a flow of interest to an autonomous system. In the example, an FoI 602 is switched from source host 610 to destination host 612, passing through AS-1 to AS-4. At the beginning, the source node 610 may send the FoI 602 to AS-1. Correspondingly, AS-1 may create the following transaction txn_0.

In a miss scenario, during the traceback, the link between the transactions is broken. In some embodiments, an AS has its own rights to decide whether a particular FoI needs to be traced and subsequently marked. Thus, if an AS's intrusion detection system (IDS) does not flag a set of packets as FoI (contrary to what its previous AS did), then this AS has the right to ignore the init transaction written into its NL for this FoI, as well as to not create and write a verify transaction into the GL. This AS may be referred to as missing-AS. If one or more of the ASes in the path of an FoI is missing-AS, then transactions due to that AS are not stored in the GL. This disclosure describes below how to generate transactions, as well as the audit process, under such special case.

For a particular AS, upon receiving a set of packets and its IDS flags it as FoI, the AS may perform the following actions as a verifier. The AS may check its own neighbour ledger and find if there is an init transaction initiated by the previous AS. If there exists the corresponding init transaction in its NL, the AS may proceed as per normal to create the verify transaction, as described above. This is a normal, non-missing scenario. If no such init transaction appears in its NL, the AS may realize that the previous AS has missed the FoI, and thus it is not even necessary to search through the previous AS's logical view of GL to find the verify transaction, because the verify transaction does not exist anyway. Instead, the AS may check the NL of the previous AS. If there exists an init transaction for the same FoI, the AS knows the AS that is two hops away did not miss the FoI, and initiated an init transaction. It is only the previous AS misses the FoI. In this case, the AS may generate a verify transaction, with the previous AS written in the initiator field, at the same time, with the AS number of the two-hop-away AS written into the reserved field. The PreTxnHash field of the newly generated verify transaction may be the hash of a string of zeroes. This is for the purpose of linking

| Initiator ID | Verifier ID | FoI ID | Status | PreTxnHash | RF | DS |
|---|---|---|---|---|---|---|
| Source ID | ASN_AS-1 | FoI ID of FoI 602 | 0 | H(00 . . . 00) | 00 . . . 0 | Sig_0 |

Note here that the initiator ID of the transaction txn_0 is the ID of source host 610, and the status field is 0 (verify transaction). Of course, AS-1 could create a transaction with init status, but it will not be necessary, as AS-1 itself will verify the same transaction. Thus, for simplicity, the transaction is directly verified. Also take note, as there is no previous transaction to the transaction txn_0 (the FoI 602 is sent from the source host 610), by default, the hash output of a sequence of zero bits may be filled into the PreTxnHash field of the transaction txn_0.

Similarly, if the AS-4 sends the FoI 602 to the destination host 612, AS-4 may create the following transaction txn_n.

up the chain during audit and tracing. The current AS then initiates an init transaction as per normal, for the next AS.

When the current AS checks the neighbour ledger of the previous AS, as described above, if it does not discover a matching init transaction for the same FoI, it means not only the previous AS, but also the AS two hops away also misses the same FoI. Under this case, the current AS does not generate any verify transaction. Instead, the current AS may simply initiate an init transaction and writes into the NL of next AS, consider itself as the first one that marks the packets

| Initiator ID | Verifier ID | FoI ID | Status | PreTxnHash | RF | DS |
|---|---|---|---|---|---|---|
| ASN_AS-4 | Destination ID | FoI ID of FoI 602 | 0 | H(txn_(n − 1)) | 00 . . . 0 | Sig_n |

The verifier ID of the transaction txn_n is the ID of destination host 612. For the PreTxnHash field of the transaction txn_n, as there is a previous transaction txn_(n−1) exists, the PreTxnHash field of the transaction txn_n simply follows the structure by hashing the previous transaction details.

as FoI. The init transaction is formatted similarly as the border-case scenario described above with reference to FIG. 6.

During audit, if the auditor discovers that the reserved field is filled with an ASN rather than a string of zeroes, it knows that there is a one-miss for this FoI. By using the ASN recorded in the reserved field, the auditor may directly search, find and audit the init transaction recorded in the previous AS's NL, and the verify transaction recorded in the GL by the AS two hops away, and continue the audit. If there are two or more misses, the auditor may simply stop at the current AS.

To summarize the operations, an AS may take different roles and subsequently perform the corresponding operations. When an AS switches an FoI to another AS, it may be the initiator, and initiate a transaction. When an AS receives an FoI, it may assume the role of verifier, and verifies the corresponding FoI. Any AS may serve as the auditor, to audit other transactions in order to maintain an accurate and authenticated global ledger.

In some embodiments, in order to perform IP traceback, a victim or an authorized investigating agency may trace the path of an FoI. For simplicity, and without loss of generality, it may be assumed that the AS serving the victim to be the investigator. At a high level, the traceback procedure is similar to the audit operation, where the investigator, instead of picking a random verify transaction, starts from the very last verify transaction (that with the "Verifier ID" field written with the ID of the destination host). The investigator may easily identify the initiator of this last verify transaction, and subsequently search through the GL to discover the previous transaction, of which the current initiator is the verifier for the same FoI. Through this recursive procedure, the investigator may traceback to the very first transaction, where the "Initiator ID" field is filled with ID of the source host. The number of lookups to be performed on the different ledgers is linear in the length of the path (or, the number of ASes in the path). An important additional step is to check, for each transaction, the number of auditors that have signed the transaction. The investigator trusts and accepts a transaction if it has been signed by at least a threshold number (e.g., n) of auditors.

Observe that, during the traceback, the investigator only has to go through the GL, i.e., the investigator does not have to check the NL transactions. Besides, the investigator may not need to verify the digital signatures and the hash result of previous transaction. These tasks would have been completed by the audit operation and ascertained by the signatures of the auditor AS. However, the investigator has the capability and freedom to do so.

The main objective of the traceback solution is to provide an accurate, verifiable and non-repudiated IP traceback mechanism. Consequently, if any participating AS is compromised or behaves suspiciously, it may try to forge a verified and audited transaction that attributes to none of the participating ASes along the routing path.

Before the analysis is presented, two reasonable assumptions are made. The first assumption is that ASes do not collude with each other. The second assumption is that every AS has the right, upon receiving a transaction with init status, not to verify this transaction and subsequently "miss" it.

The motivation for the second assumption is the following: as each AS deploys its own intrusion detection system, it is likely that, when it receives a set of marked packets (indicating it is an FoI) from the upstream AS, the current AS's IDS may not be triggered and thus consider these packets as FoI. This scenario is entirely possible. For example, due to different sensitivity settings, the detection results could be different. Thus, the current AS may ignore the transaction initiated by the upstream AS that is written into its NL, and simply forward the packets to the next AS.

Of course, the current AS will not initiate another transaction either and will not write into the NL of downstream neighbour AS.

To illustrate, take an example that AS-1 switches an FoI to AS-2, and at the same time writes an init transaction into the NL of AS-2. AS-1 may also mark the packets of the FoI. Upon receiving the FoI, the IDS of AS-2 does not find the traffic flow as a threat, and thus will not log the FoI information into its buffer storage. It simply forwards the packets to the downstream AS, say AS-3. Later, when AS-2 receives the init transaction in its NL from AS-1 (assuming a slight delay for the init transaction to be written into the NL of AS-2), AS-2 will not find a corresponding FoI record in its buffer, and therefore will ignore the init transaction initiated by AS-1.

Notice that there are two further possibilities when AS-2 forwards the packets to AS-3. AS-2 may change the markings made by AS-1 (e.g., removing the markings), such that these packets become a non-FoI in the view of the downstream AS-3. Alternatively, AS-2 makes no change on the marking but simply forwards the packets. Regardless of the case, AS-3 will operate as per normal: through its own IDS, AS-3 decides whether the packets form an FoI. If so, AS-3 may proceed to initiate and verify a transaction by itself (Initiator ID is then AS-2) and write into the GL (as AS-3 never receives an init transaction from AS-2). If the IDS report that the packets do not form an FoI, then AS-3 may behave the same as AS-2.

Another motivation for the second assumption is to prevent a denial-of-service (DoS) attack. If the upstream AS-1 is malicious, it may launch a DoS attack targeting AS-2 by considering every packet as FoI, keep generating init transactions and write into NL-2. If by default we require an AS to not miss any init transaction, then AS-2 will be busy with verifying these transactions and soon will be overwhelmed.

The effect resulting from this assumption 2, allowing an AS to ignore a transaction, is quite minimal. It may break the chain of path tracing, but by some moderate extra effort, one may still discover the previous transactions, even if there is a gap in the chain (path). Subsequently, the tracing party may also query the transaction-missing AS, for example AS-2 in our example, why it did so.

As assumed above, an AS has the right to ignore any init transaction. Therefore, this is not a malicious activity. The aim of a malicious AS is to forge transactions such that, during traceback, the result diverts the routing path to a non-participating AS (either upstream or downstream), or does not show this malicious AS participated in the routing path, when in reality it did.

Figure 7A:
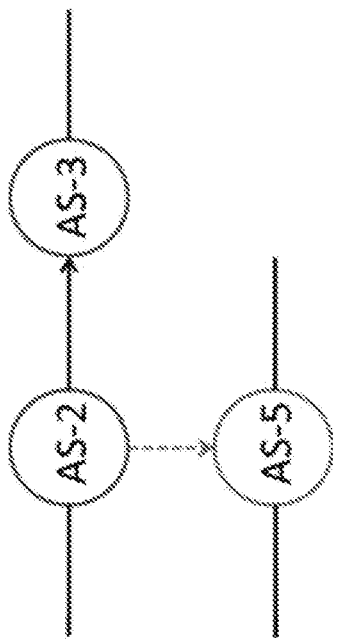
FIG. 7A is a diagram illustrating an example of an attempt to divert the path to a non-participating upstream router.

FIG. 7A is a diagram 700 illustrating an example of an attempt to divert the path to a non-participating upstream router. In this example, the FoI is switched from AS-1 to AS-2 (shown in a solid arrow). However AS-2 tries to forge a transaction such that, later during the audit process, the result will attribute the FoI as switched from AS-5 (shown in dotted arrow), instead of AS-1.

This attack is unlikely to succeed with the traceback solution of this disclosure. First, AS-1 may initiate an init transaction and write into AS-2's NL as per normal. Of course, as discussed above under the second assumption, AS-2 may simply miss this init transaction.

What is more important for AS-2 is to create a verify transaction and write into the global ledger GL. To form such a transaction, AS-2 could easily fill up the transaction fields as "Initiator ID=AS-5, Verifier ID=AS-2, FoI ID= (actual FoI ID)" and "Status=0". It could also generate a valid digital signature as long as it could obtain the PreTxn- Hash field. However, for the last PreTxnHash field, AS-2 is supposed to extract the init transaction from the NL of AS-2, and the init transaction is initiated and written by AS-5. However, as AS-5 never did so, the transaction record does not exist in the NL of AS-2. Furthermore, AS-2 cannot forge a valid init transaction on behalf of AS-5, because for that transaction to be forged, it requires again the previous transaction that is verified by AS-5 (to produce the PreTxn-Hash), which never existed. In addition, AS-2 cannot generate a valid AS-5 signature, as it does not have the private signing key of AS-5.

With the above, the only way for AS-2 is to generate a verify transaction, put a random value at the PreTxnHash field of the verify transaction, generate a signature to form a complete transaction record, and put the verify transaction into the GL. Note that the signature is indeed valid, as AS-2 has control of its own private signing key. However, during audit, it could be easily discovered that this transaction is not properly formed. While tracing the routing path, the auditor needs to find a corresponding init transaction provided by AS-5 in the NL of AS-2. As discussed above, it is impossible for AS-2 to forge such a valid init transaction on behalf of AS-5. This concludes the analysis that such kind of attack is not possible.

Furthermore, it is also impossible to achieve a replay attack with the traceback solution of this disclosure. It may be tempting to think that AS-2 could extract a valid AS-5 signature through either the NL or GL (as AS-5 definitely has recorded some legitimate transactions into the ledgers), and append it to the current, wish-to-forge transaction. However, this signature will not pass the verification process, unless the FoI field on the transaction containing this extracted signature is the exact same as the current FoI. This is also impossible as a time stamp is involved inside the FoI ID format. With this analysis, the replay attack is not possible, and will not be further discussed in the subsequent cases.

Figure 7B:
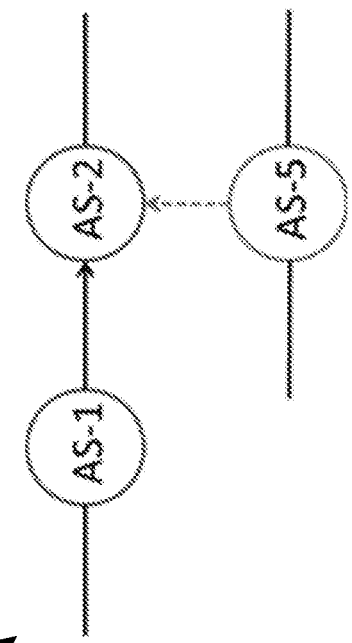
FIG. 7B is a diagram illustrating an example of an attempt to divert the path to a non-participating downstream router.

FIG. 7B is a diagram 720 illustrating an example of an attempt to divert the path to a non-participating downstream router. In this example, the FoI is switched from AS-2 to AS-3 (solid arrow). However, AS-2 may try to forge a transaction such that, during audit process, the result may attribute the FoI as switched to AS-5 (dotted arrow), instead of AS-3.

The impossibility of this attack is relatively easy to explain. First, AS-2 will neither initiate a transaction nor write anything into AS-3's NL (as it tries to forge the path directing to AS-5). When AS-3 receives the FoI, its IDS will tell whether AS-3 should consider it as an FoI. If not, AS-3 simply forwards the packets. As there is no init transaction in its NL, AS-3 will consider itself as in the border-case scenario, self-create and verify a transaction, and write into the GL. Subsequently, AS-3 will initiate an init transaction and write to downstream AS's NL, and the process proceeds as per defined.

Back to AS-2, its aim is to create an init transaction and write into AS-5's NL. This is entirely possible, as AS-2 may simply fill up the transaction fields as below.

| Initiator ID | Verifier ID | FoI ID | Status | PreTxnHash | DS |
|---|---|---|---|---|---|
| ASN_AS-2 | ASN_AS-5 | ID of FoI | 1 | H(Pre_txn) | Sig |

Notice that the challenge for the previous attack (described above with reference to FIG. 7A) no longer exists in this case. AS-2 actually does have a valid transaction from its previous upstream AS, thus could compute a legitimate PreTxnHash value, and generate a valid signature based on the filled components. In other words, the init transaction AS-2 writes into the NL of AS-5 is actually legitimately formed. However, this attack stops here. As AS-5 never receives such an FoI, and the FoI will not exist in AS-5's buffer, AS-5 will simply ignore this init transaction. Furthermore, AS-5 will not create any subsequent verify or init transaction related to this FoI. Thus during audit or traceback, it would be impossible to link the routing path to AS-5.

Figure 7C:
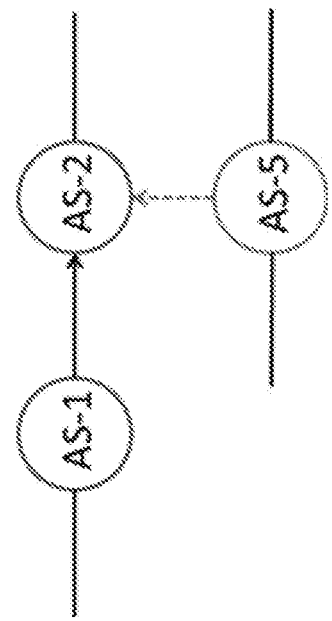
FIG. 7C is a diagram illustrating an example of an attempt by an autonomous system that has switched a flow of interest to exclude itself in the routing path of the flow of interest.

FIG. 7C is a diagram 740 illustrating an example of an attempt by an autonomous system that has switched a flow of interest to exclude itself in the routing path of the flow of interest. Under this attack, the FoI actually is switched from AS-1 to AS-2 then to AS-3 (solid arrow). However, AS-2 may try to forge transactions such that during traceback, the mechanism shows the FoI is directly switched from AS-1 to AS-3, without passing AS-2 (dotted arrow). Note that this attack is the exact opposite of the traditional man-in-the-middle (MITM) attack. In MITM, the two communicating parties are not aware of the fact that, there is an attacker sits in between of them, and manipulating the information, while the man in the middle could escape from detection. In the example, on the contrary, both AS-1 and AS-3 are aware of AS-2 and communicates with it. However, during traceback, AS-2 may escape from detection by excluding itself in the routing path.

AS-2 has the following, legitimate init transaction txn_b initiated by AS-1 and written in the NL of AS-2.

| ASN_AS-1 | ASN_AS-2 | FoI ID | 1 | H(txn_a) | Sig_(AS_1) |
|---|---|---|---|---|---|

AS-2 may also extract the following legitimate verify transaction txn_a (prior to txn_b, used for the PreTxnHash field for txn_b) from GL, of which is the verified transaction generated by AS-1 when AS-1 received this FoI from some other AS' earlier.

| ASN_AS' | ASN_AS-1 | FoI ID | 0 | H(txn_AS') | Sig_(AS_1) |
|---|---|---|---|---|---|

To launch the attack, the first attempt by AS-2 is to directly forge a verify transaction on behalf of AS-3, indicating this FoI is switched from AS-1 to AS-3, and write into GL. This forged transaction should have the following format.

| ASN_AS-1 | ASN_AS-3 | FoI ID | 0 | H(txn_c) | Sig_(AS_3) |
|---|---|---|---|---|---|

However, it is impossible to forge such a transaction, as 1) AS-2 cannot forge a valid digital signature on behalf of AS-3, as AS-2 does not have the corresponding signing key of AS-3; and 2) the txn_c used for generating the PreTxn-Hash field does not exist. This txn_c should be an init transaction provided by AS-1 if AS-1 switches the FoI to AS-3. However, this never happened, and thus this transaction does not exist.

The second attempt by AS-2 is to generate an init transaction and write into AS-3's NL on behalf of AS-1, in the hope that this tricks AS-3 to think AS-1 initiated this FoI transaction, subsequently verify it and writes the verify transaction into GL by AS-3 itself (thus it will be legitimate). To do so, AS-2 needs to craft an init transaction, which we call txn_d, with the following format.

| ASN_AS-1 | ASN_AS-3 | FoI ID | 1 | H(txn_a) | Sig_(AS_1) |

Notice here the previous transaction used to craft PreTxn-Hash field of the transaction txn_d is transaction txn_a, which is the one that verified by AS-1 when AS-1 received the FoI from another AS'. If AS-2 could craft transaction txn_d successfully, then it could trick AS-3 to think it is AS-1 who initiated this transaction. AS-2 actually has the txn_a record, as it could be extracted from the GL. Thus, the challenge No. 2) in the previous attempt is no longer an obstacle. However, to launch this attack is still impossible, with the same reason as above. That is, AS-2 cannot forge a valid AS-1 signature based on the first five fields of txn_d.

The transaction txn_b mentioned above is very similar to the transaction txn_d that AS-2 wishes to forge. The only difference is at the Verifier ID field, where transaction txn_b has ASN_AS-2, while transaction txn_d has ASN_AS-3. This difference will make the valid signature in transaction txn_b invalid if AS-2 tries to launch a reply attack by embedding this signature into transaction txn_d.

Figure 7D:
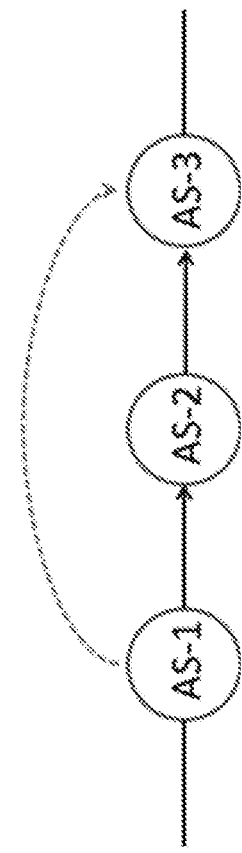
FIG. 7D is a diagram illustrating an example of an attempt to launch an attack due to the miss-scenario.

FIG. 7D is a diagram 760 illustrating an example of an attempt to launch an attack due to the miss-scenario. Under such an attack, a malicious AS aims to attribute the miss of an FoI to an innocent AS. In the example, AS-1 misses the FoI, and transmits the packets to AS-2. However, AS-2 may wish to attribute the miss to AS-5. Assuming this is just a one-hop miss, it would then be impossible for AS-2 to launch such an attack because, for the verify transaction AS-2 wishes to forge, AS-2 has to indicate an AS number in the reserved field, of which this AS is a neighbour of AS-5. During audit, there is actually no such init transaction corresponding to the same FoI exists in the NL of AS-5, and the forged verify transaction cannot pass the audit.

In some embodiments, an autonomous system, assuming the role of an auditor, may add its own (valid) signature to either the NL or GL auditor digital signature field, without actually auditing the transactions (i.e., performing the computation such as signature verification and hash output verification). Such actions cannot be prevented and the signature added by such an AS is valid. However, it is assumed that the majority of the ASes are honest and perform the audit faithfully. A threshold value may be set in the traceback solution, requiring a number of signatures from different ASes need to be added to the ledger, in order to confirm the validity of the transaction. The more the number of signatures added for a particular transaction, the more reliable and secure this particular transaction is. This mechanism is similar to the confirmation of a transaction in a bitcoin blockchain, and resembles a simple consensus protocol: the majority of the participants are honest.

Figure 8:
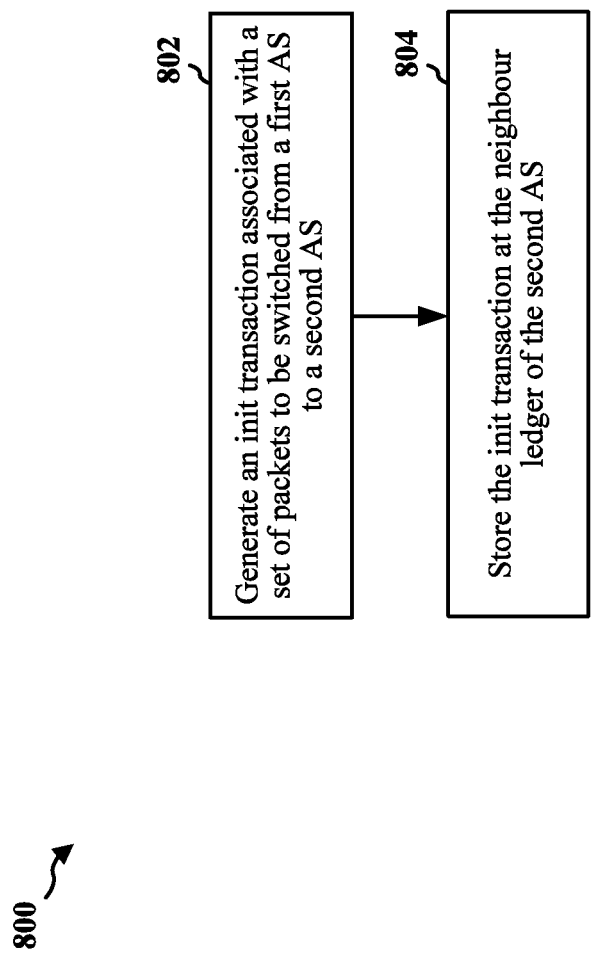
FIG. 8 is a flowchart of a method of IP traceback.

FIG. 8 is a flowchart 800 of a method of IP traceback. The method may include operations performed for transaction initiation. In some embodiments, the method may be performed by an autonomous system. In some embodiments, the method may be performed by an apparatus (e.g., the apparatus 1202/1202' shown in FIG. 12 or FIG. 13) of an AS. At 802, the apparatus may generate an init transaction associated with a set of packets to be switched from a first AS to a second AS. The set of packets may form an FoI.

At 804, the apparatus may store the init transaction at the neighbour ledger of the second AS. In some embodiments, the apparatus may be the first AS. In some embodiments, the apparatus may be part of the first AS.

Figure 9:
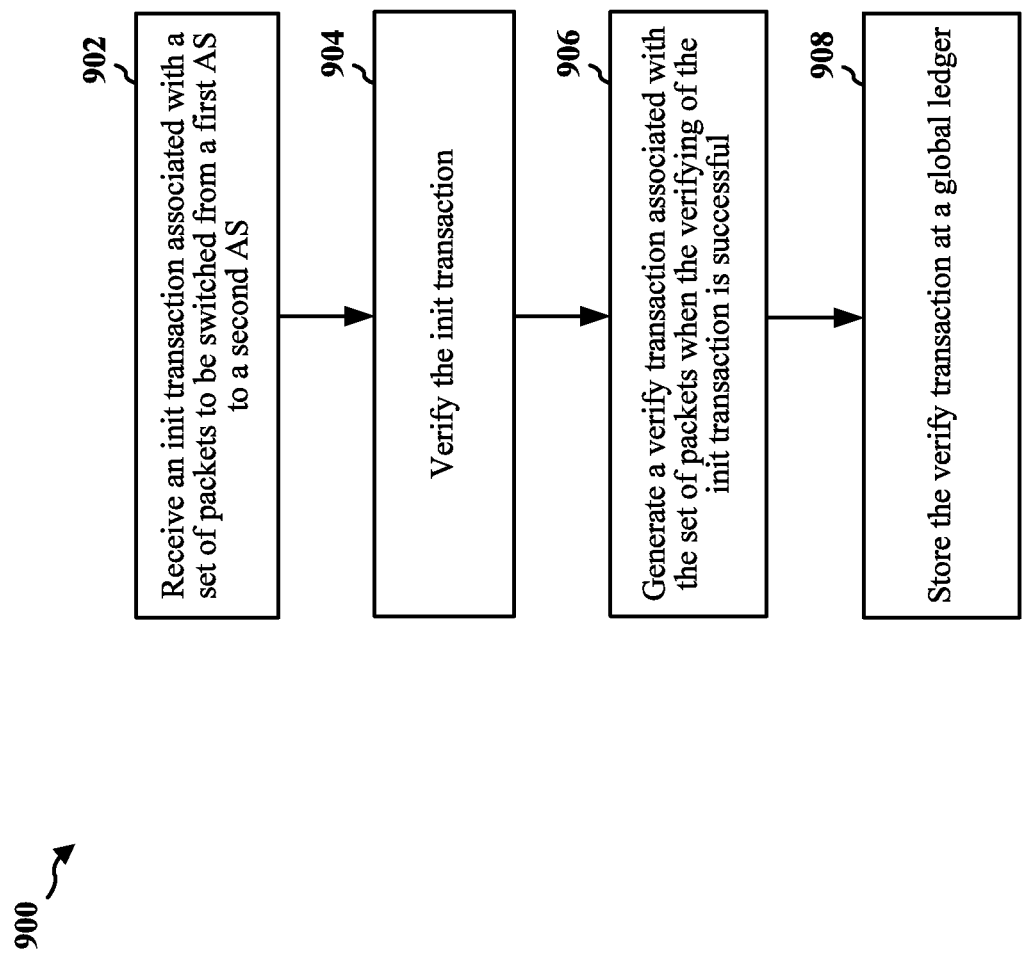
FIG. 9 is a flowchart of a method of IP traceback.

FIG. 9 is a flowchart 900 of a method of IP traceback. The method may include operations performed for transaction verification. In some embodiments, the method may be performed by an autonomous system. In some embodiments, the method may be performed by an apparatus (e.g., the apparatus 1202/1202' shown in FIG. 12 or FIG. 13) of an AS. At 902, the apparatus may receive an init transaction associated with a set of packets to be switched from a first AS to a second AS. The set of packets may form an FoI. In some embodiments, the apparatus may be the second AS. In some embodiments, the apparatus may be part of the second AS. In some embodiments, the init transaction may be generated by the first autonomous system and stored at a neighbor ledger of the second autonomous system.

In some embodiments, the set of packets may be identified by an identifier created based on the source IP address of the set of packets, the destination IP address of the set of packets, source ports of the set of packets, destination ports of the set of packets, the protocol associated with the set of packets, a timestamp associated with the set of packets, and the hash of payloads of the set of packets. The init transaction may include the identifier of the set of packets. In some embodiments, the init transaction may include a digital signature generated by the first autonomous system using the private key of the first autonomous system.

At 904, the apparatus may verify the init transaction. In some embodiments, to verify the init transaction, the apparatus may determine whether the set of packets associated with the init transaction is received at the second autonomous system, verify the digital signature included in the init transaction using the public key of the first autonomous system, identify the previous transaction of the init transaction by searching the global ledger, and verify that a hash value included in the init transaction matches the hash output of the previous transaction.

In some embodiments, the set of packets is received at the second autonomous system if the difference between the timestamp associated with packets received at the second autonomous system and the timestamp associated with the set of packets satisfies a threshold value, and other components of the identifier of the received packets and the identifier of the set of packets are the same. In some embodiments, the verification of the init transaction is successful if the set of packets is received at the second autonomous system, and the verification of the digital signature is successful, and the verification of the hash value included in the init transaction is successful.

At 906, the apparatus may generate a verify transaction associated with the set of packets when the verifying of the init transaction is successful. In some embodiments, a hash value included in the verify transaction may be the hash output of the init transaction.

At 908, the apparatus may store the verify transaction at a global ledger. In some embodiments, the global ledger may include a decentralized and distributed storage and stores verified and audited transactions.

Figure 10:
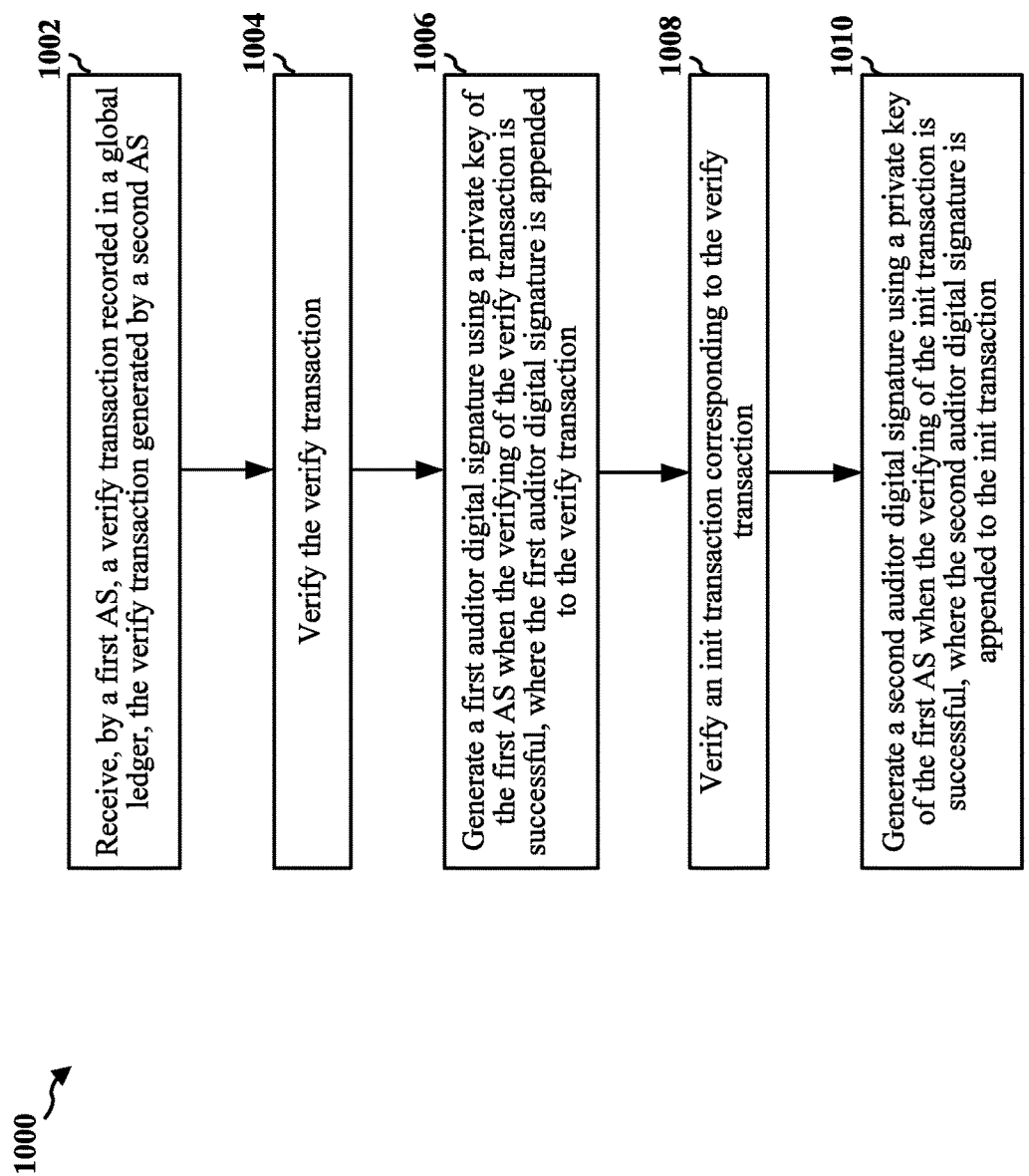
FIG. 10 is a flowchart of a method of IP traceback.

FIG. 10 is a flowchart 1000 of a method of IP traceback. The method may include operations performed for auditing transactions. In some embodiments, the method may be performed by an autonomous system. In some embodiments, the method may be performed by an apparatus (e.g., the apparatus 1202/1202' shown in FIG. 12 or FIG. 13) of an AS. At 1002, the apparatus may receive a verify transaction recorded in a global ledger. The apparatus may be or belong to a first AS. The verify transaction may be generated by a second AS. In some embodiments, the global ledger may include a decentralized and distributed storage and stores verified and audited transactions.

At 1004, the apparatus may verify the verify transaction. In some embodiments, to verify the verify transaction, the apparatus may: verify a digital signature included in the verify transaction using the public key of the second autonomous system; identifying an init transaction corresponding to the verify transaction by searching the neighbor ledger of the second autonomous system; and verifying that a hash value included in the verify transaction matches the hash output of the init transaction. In some embodiments, the verification of the verify transaction is successful if the verification of the digital signature included in the verify transaction is successful and the verification of the hash value included in the verify transaction is successful.

At 1006, the apparatus may generate a first auditor digital signature using a private key of the first AS if the verification of the verify transaction is successful. The first auditor digital signature may be appended to the verify transaction.

At 1008, the apparatus may verify an init transaction corresponding to the verify transaction. In some embodiments, to verify the init transaction, the apparatus may: identify a previous transaction of the init transaction by searching the global ledger; verify a digital signature included in the init transaction using the public key of a third autonomous system that generates the init transaction; and verify that a hash value included in the init transaction matches the hash output of the previous transaction.

At 1010, the apparatus may generate a second auditor digital signature using a private key of the first AS if the verification of the init transaction is successful. The second auditor digital signature may be appended to the init transaction. In some embodiments, the verification of the init transaction is successful if the verification of the digital signature included in the init transaction is successful and the verification of the hash value included in the init transaction is successful.

Figure 11:
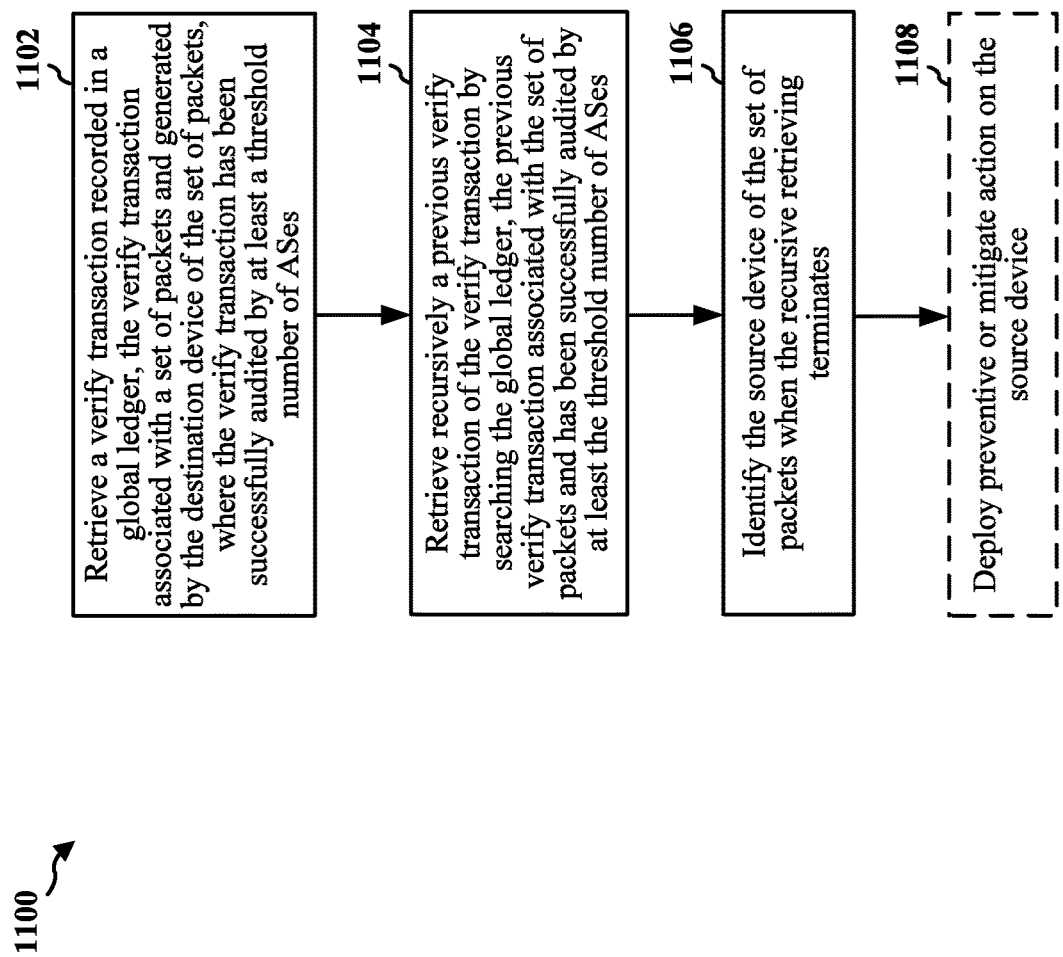
FIG. 11 is a flowchart of a method of IP traceback.

FIG. 11 is a flowchart 1100 of a method of IP traceback. In some embodiments, the method may be performed by an autonomous system. In some embodiments, the method may be performed by an apparatus (e.g., the apparatus 1202/1202' shown in FIG. 12 or FIG. 13) of an AS. At 1102, the apparatus may retrieve a verify transaction recorded in a global ledger. The verify transaction may be associated with a set of packets and generated by the destination device of the set of packets. The verify transaction may have been successfully audited by at least a threshold number of ASes. The set of packets may form an FoI. In some embodiments, the global ledger may include a decentralized and distributed storage and store verified and audited transactions.

At 1104, the apparatus may retrieve recursively the previous verify transaction of the verify transaction by searching the global ledger. The previous verify transaction may be associated with the set of packets and has been successfully audited by at least the threshold number of ASes. In some embodiments, the verify transaction and the previous verify transaction may be successfully audited by at least the threshold number of autonomous systems if each of the verify transaction and the previous verify transaction is appended with at least the threshold number of auditor digital signatures by different ASes.

At 1106, the apparatus may identify the source device of the set of packets when the recursive retrieval of previous verify transaction terminates. In some embodiments, the recursive retrieval terminates when the previous verify transaction fails to be retrieved via searching the global ledger. In some embodiments, the previous verify transaction may be retrieved based on an initiator value included in the verify transaction. In some embodiments, the previous verify transaction may be retrieved based on a value in the reserved field of the verify transaction.

At 1108, the apparatus may optionally deploy preventive or mitigate action on the source device. For example, the apparatus may block or rate limit packets from the source device.

Figure 12:
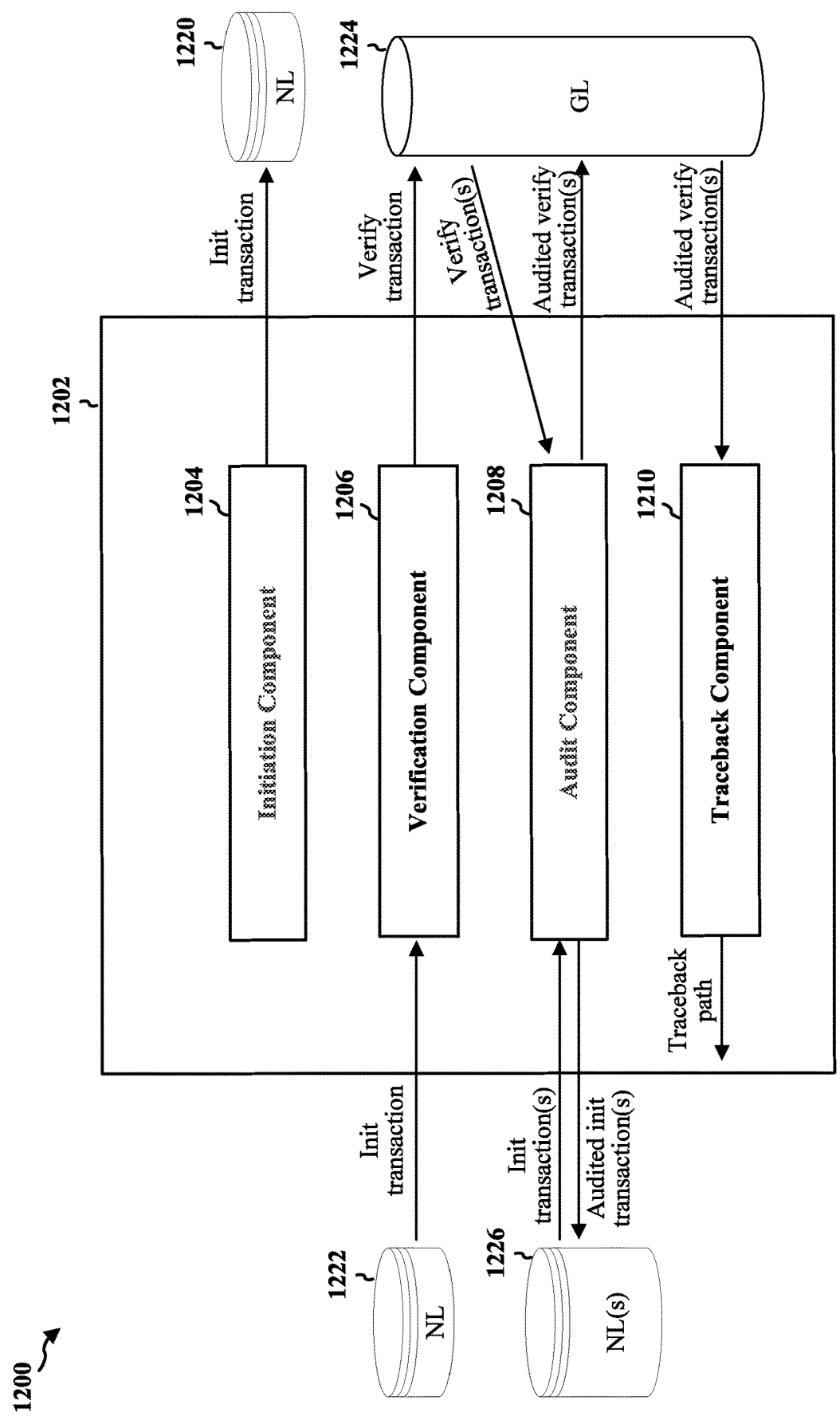
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be a computing device or a system including multiple computing devices.

The apparatus 1202 may include an initiation component 1204 that generates an init transaction and stores the init transaction into the NL 1220 of a neighbor AS. In one embodiment, the init component 1204 may perform the operations described above with reference to 802 or 804 in FIG. 8.

The apparatus 1202 may include a verification component 1206 that retrieves an init transaction from an associated NL 1222, generates a corresponding verify transaction, and stores the verify transaction into the GL 1224. In one embodiment, the verification component 1206 may perform the operations described above with reference to 902, 904, 906, or 908 in FIG. 9.

The apparatus 1202 may include an audit component 1208 that audits verify transactions in the GL 1224 and their corresponding init transactions in various NLs 1226. In one embodiment, the audit component 1208 may perform the operations described above with reference to 1002, 1004, 1006, 1008, or 1010 in FIG. 10.

The apparatus 1202 may include a traceback component 1210 that identifies a traceback path based on audited verify transactions in the GL 1224. In one embodiment, the traceback component 1210 may perform the operations described above with reference to 1102, 1104, 1106, or 1108 in FIG. 11.

The apparatus 1202 may include additional components that perform each of the blocks of the algorithm in the aforementioned flowcharts of FIGS. 8-11. As such, each block in the aforementioned flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
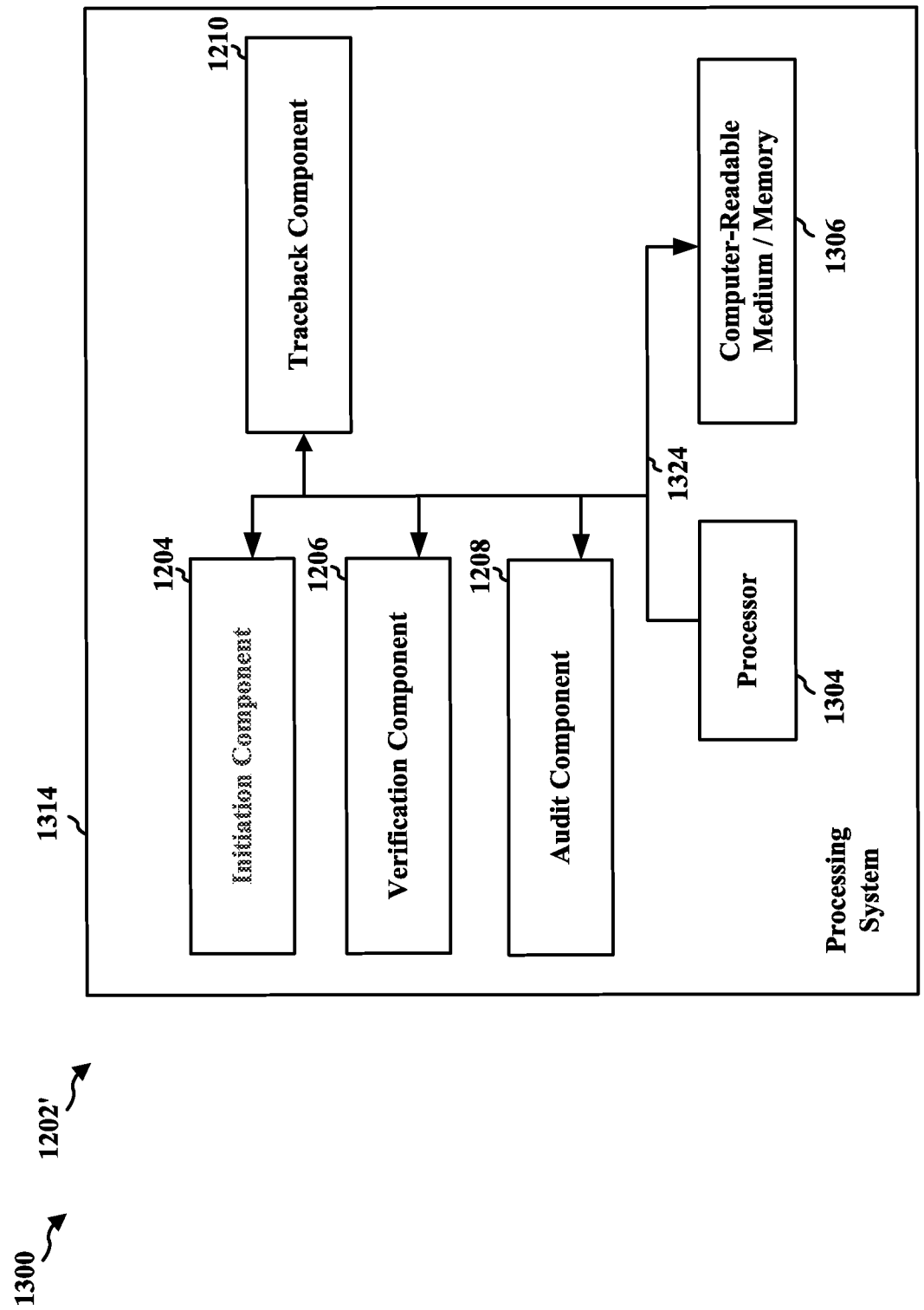
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. In some embodiments, the apparatus 1202' may be the apparatus 1202 described above with reference to FIG. 12. The apparatus 1202' may include one or more computing devices. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof.

In the following, various aspects of this disclosure will be illustrated:

Example 1 is a method or apparatus for IP traceback. The apparatus may receive an init transaction associated with a set of packets to be switched from a first autonomous system to a second autonomous system. The apparatus may verify the init transaction. The apparatus may generate a verify transaction associated with the set of packets when the verifying of the init transaction is successful. The apparatus may store the verify transaction at a global ledger.

In Example 2, the subject matter of Example 1 may optionally include that the init transaction is generated by the first autonomous system and stored at a neighbor ledger of the second autonomous system.

In Example 3, the subject matter of any one of Examples 1 to 2 may optionally include that the global ledger includes a decentralized and distributed storage and stores verified and audited transactions.

In Example 4, the subject matter of any one of Examples 1 to 3 may optionally include that the set of packets is identified by an identifier created based on a source IP address of the set of packets, a destination IP address of the set of packets, source ports of the set of packets, destination ports of the set of packets, a protocol associated with the set of packets, a timestamp associated with the set of packets, and a hash of payloads of the set of packets, where the init transaction includes the identifier of the set of packets.

In Example 5, the subject matter of Example 4 may optionally include that the init transaction includes a digital signature generated by the first autonomous system using a private key of the first autonomous system.

In Example 6, the subject matter of Example 5 may optionally include that, to verify the init transaction, the apparatus may: determine whether the set of packets associated with the init transaction is received at the second autonomous system; verify the digital signature included in the init transaction using a public key of the first autonomous system; identify a previous transaction of the init transaction by searching the global ledger; and verify that a hash value included in the init transaction matches a hash output of the previous transaction.

In Example 7, the subject matter of Example 6 may optionally include that the set of packets is received at the second autonomous system when a difference between a timestamp associated with packets received at the second autonomous system and the timestamp associated with the set of packets satisfies a threshold value, and other components of the identifier of the received packets and the identifier of the set of packets are the same.

In Example 8, the subject matter of Example 6 may optionally include that the verifying of the init transaction is successful when the set of packets is received at the second autonomous system, and the verifying of the digital signature is successful, and the verifying of the hash value included in the init transaction is successful.

In Example 9, the subject matter of any one of Examples 1 to 8 may optionally include that a hash value included in the verify transaction is the hash output of the init transaction.

Example 10 is a method or apparatus for IP traceback. The apparatus may belong to a first AS. The apparatus may receive a verify transaction recorded in a global ledger. The verify transaction may be generated by a second autonomous system. The apparatus may verify the verify transaction. The apparatus may generate an auditor digital signature using a private key of the first autonomous system when the verifying of the verify transaction is successful. The auditor digital signature is appended to the verify transaction.

In Example 11, the subject matter of Example 10 may optionally include that, to verify the verify transaction, the apparatus may: verify a digital signature included in the verify transaction using a public key of the second autonomous system; identify an init transaction corresponding to the verify transaction by searching a neighbor ledger of the second autonomous system; and verify that a hash value included in the verify transaction matches a hash output of the init transaction.

In Example 12, the subject matter of Example 11 may optionally include that the verifying of the verify transaction is successful when the verifying of the digital signature included in the verify transaction is successful and the verifying of the hash value included in the verify transaction is successful.

In Example 13, the subject matter of any one of Examples 11 to 12 may optionally include that the apparatus may further verify the init transaction.

In Example 14, the subject matter of Example 13 may optionally include that, to verify the init transaction, the apparatus may: identify a previous transaction of the init transaction by searching the global ledger; verify a digital signature included in the init transaction using a public key of a third autonomous system that generates the init transaction; and verify that a hash value included in the init transaction matches the hash output of the previous transaction.

In Example 15, the subject matter of Example 14 may optionally include that the apparatus may further generate a second auditor digital signature using a private key of the first autonomous system when the verifying of the digital signature included in the init transaction is successful and the verifying of the hash value included in the init transaction is successful, where the second auditor digital signature is appended to the init transaction.

In Example 16, the subject matter of any one Examples 10 to 15 may optionally include that the global ledger includes a decentralized and distributed storage and stores verified and audited transactions.

Example 17 is a method or apparatus for IP traceback. The apparatus may retrieve a verify transaction recorded in a global ledger. The verify transaction may be associated with a set of packets and generated by a destination device for the set of packets. The verify transaction has been successfully audited by at least a threshold number of autonomous systems. The apparatus may retrieve recursively a previous verify transaction of the verify transaction by searching the global ledger. The previous verify transaction is associated with the set of packets and has been successfully audited by at least the threshold number of autonomous systems. The apparatus may identify a source device for the set of packets when the recursive retrieving terminates.

In Example 18, the subject matter of Example 17 may optionally include that the recursive retrieving terminates when the previous verify transaction fails to be retrieved via searching the global ledger.

In Example 19, the subject matter of any one of Examples 17 to 18 may optionally include that the apparatus may deploy preventive or mitigate action on the source device.

In Example 20, the subject matter of any one of Examples 17 to 19 may optionally include that the previous verify transaction is retrieved based on an initiator value included in the verify transaction.

In Example 21, the subject matter of any one of Examples 17 to 19 may optionally include that the previous verify transaction is retrieved based on a value in a reserved field of the verify transaction.

In Example 22, the subject matter of any one of Examples 17 to 21 may optionally include that the global ledger includes a decentralized and distributed storage and stores verified and audited transactions.

In Example 23, the subject matter of any one of Examples 17 to 22 may optionally include that the verify transaction and the previous verify transaction are successfully audited by at least the threshold number of autonomous systems when each of the verify transaction and the previous verify transaction is appended with at least the threshold number of auditor digital signatures.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of internet protocol traceback, comprising:
receiving an init transaction associated with a set of packets to be switched from a first autonomous system to a second autonomous system;
verifying the init transaction;
generating a verify transaction associated with the set of packets when the verifying of the init transaction is successful; and
storing the verify transaction in a global ledger, wherein the set of packets is identified by an identifier created based on a source internet protocol address of the set of packets, a destination internet protocol address of the set of packets, source ports of the set of packets, destination ports of the set of packets, a protocol associated with the set of packets, a timestamp associated with the set of packets, and a hash of payloads of the set of packets, wherein the init transaction comprises the identifier of the set of packets,
the init transaction comprises a digital signature generated by the first autonomous system using a private key of the first autonomous system, and
the verifying of the init transaction comprises:
determining whether the set of packets associated with the init transaction is received at the second autonomous system;
verifying the digital signature included in the init transaction using a public key of the first autonomous system;
identifying a previous transaction of the init transaction by searching the global ledger; and
verifying that a hash value included in the init transaction matches a hash output of the previous transaction.

2. The method of claim 1, wherein the init transaction is generated by the first autonomous system and stored in a neighbor ledger of the second autonomous system.

3. The method of claim 1, wherein the set of packets is received at the second autonomous system when a difference between a timestamp associated with packets received at the second autonomous system and the timestamp associated with the set of packets satisfies a threshold value, and other components of an identifier of the received packets and the identifier of the set of packets are the same.

4. The method of claim 1, wherein the verifying of the init transaction is successful when the set of packets is received at the second autonomous system, and the verifying of the digital signature is successful, and the verifying of the hash value included in the init transaction is successful.

5. The method of claim 1, wherein a hash value included in the verify transaction is a hash output of the init transaction.

6. A method of internet protocol traceback, comprising:
receiving, by a first autonomous system, a verify transaction recorded in a global ledger, the verify transaction generated by a second autonomous system;
verifying, by the first autonomous system, the verify transaction; and
generating an auditor digital signature using a private key of the first autonomous system when the verifying of the verify transaction is successful, wherein the auditor digital signature is appended to the verify transaction, wherein
the verifying of the verify transaction comprises:
verifying a digital signature included in the verify transaction using a public key of the second autonomous system;
identifying an init transaction corresponding to the verify transaction by searching a neighbor ledger of the second autonomous system; and
verifying that a hash value included in the verify transaction matches a hash output of the init transaction, and
the verifying of the verify transaction is successful when the verifying of the digital signature included in the verify transaction is successful and the verifying of the hash value included in the verify transaction is successful.

7. The method of claim 6, further comprising:
verifying, by the first autonomous system, the init transaction.

8. The method of claim 7, wherein the verifying of the init transaction comprises:
identifying a previous transaction of the init transaction by searching the global ledger;
verifying a digital signature included in the init transaction using a public key of a third autonomous system that generates the init transaction; and
verifying that a hash value included in the init transaction matches a hash output of the previous transaction.

9. The method of claim 8, further comprising:
generating a second auditor digital signature using a private key of the first autonomous system when the verifying of the digital signature included in the init transaction is successful and the verifying of the hash value included in the init transaction is successful, wherein the second auditor digital signature is appended to the init transaction.

10. A method of internet protocol traceback, comprising:
retrieving a verify transaction recorded in a global ledger, the verify transaction associated with a set of packets and generated by a destination device for the set of packets, wherein the verify transaction has been successfully audited by at least a threshold number of autonomous systems;
retrieving recursively a previous verify transaction of the verify transaction by searching the global ledger, wherein the previous verify transaction is associated with the set of packets and has been successfully audited by at least the threshold number of autonomous systems; and
identifying a source device for the set of packets when the recursive retrieving terminates,
wherein the verify transaction and the previous verify transaction are successfully audited by at least the threshold number of autonomous systems when each of the verify transaction and the previous verify transaction is appended with at least the threshold number of auditor digital signatures.

11. The method of claim 10, wherein the recursive retrieving terminates when the previous verify transaction fails to be retrieved via searching the global ledger.

12. The method of claim 10, further comprising deploying preventive or mitigate action on the source device.

13. The method of claim 10, wherein the previous verify transaction is retrieved based on an initiator value included in the verify transaction.

14. The method of claim 10, wherein the previous verify transaction is retrieved based on a value in a reserved field of the verify transaction.

* * * * *